(12) United States Patent
Oetting

(10) Patent No.: US 10,447,945 B2
(45) Date of Patent: *Oct. 15, 2019

(54) METHODS, SYSTEMS, AND PRODUCTS FOR TELEPRESENCE VISUALIZATIONS

(71) Applicant: AT&T Intellectual Property I, L.P., Atlanta, GA (US)

(72) Inventor: John Oetting, Zionsville, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,077

(22) Filed: Sep. 10, 2018

(65) Prior Publication Data

US 2019/0007628 A1 Jan. 3, 2019

Related U.S. Application Data

(63) Continuation of application No. 15/459,990, filed on Mar. 15, 2017, now Pat. No. 10,075,656, which is a
(Continued)

(51) Int. Cl.
| | |
|---|---|
| *H04N 7/15* | (2006.01) |
| *H04N 7/14* | (2006.01) |
| *H04N 5/272* | (2006.01) |
| *G06F 3/01* | (2006.01) |
| *G01C 11/02* | (2006.01) |
| *G01S 17/42* | (2006.01) |
| *G01S 17/89* | (2006.01) |

(52) U.S. Cl.
CPC .......... *H04N 5/272* (2013.01); *G01C 11/025* (2013.01); *G01S 17/42* (2013.01); *G01S 17/89* (2013.01); *G06F 3/013* (2013.01); *H04N 7/142* (2013.01); *H04N 7/15* (2013.01); *H04N 7/152* (2013.01)

(58) Field of Classification Search
CPC .......... H04N 5/272; H04N 7/15; G01S 17/89; G01S 17/42; G01C 11/025; G06F 3/013
USPC ............. 348/14.01–14.06; 709/204; 715/753
See application file for complete search history.

(56) References Cited

U.S. PATENT DOCUMENTS

| | | | |
|---|---|---|---|
| 5,063,520 A | 11/1991 | Klein | |
| 5,926,463 A | 7/1999 | Ahearn et al. | |

(Continued)

FOREIGN PATENT DOCUMENTS

| | | |
|---|---|---|
| JP | 60208184 | 10/1985 |
| JP | 62149287 | 7/1987 |

(Continued)

OTHER PUBLICATIONS

Zhang, Viewpoint: a distributed, immersive teleconferencing system with infrared dot pattern, IEEE Multimedia (Jan.-Mar. 2013) 20(1):17-27.

(Continued)

*Primary Examiner* — Melur Ramakrishnaiah
(74) *Attorney, Agent, or Firm* — Haynes and Boone, LLP

(57) ABSTRACT

Methods, systems, and products generate telepresence visualizations for a remote participant to a videoconference. A central server superimposes the remote participant onto images or video of the teleconferencing environment. The central server thus generates an illusion that the remote participant is in the same conferencing environment as other conferees.

20 Claims, 25 Drawing Sheets

Related U.S. Application Data continuation-in-part of application No. 15/417,421, filed on Jan. 27, 2017, now Pat. No. 10,044,945, which is a continuation of application No. 14/934,177, filed on Nov. 6, 2015, now Pat. No. 9,591,264, which is a continuation of application No. 14/067,016, filed on Oct. 30, 2013, now Pat. No. 9,210,377.

(56) References Cited

U.S. PATENT DOCUMENTS

| | | | |
|---|---|---|---|
| 5,940,139 | A | 8/1999 | Smoot |
| 6,573,912 | B1 | 6/2003 | Suzuki |
| 6,636,239 | B1 | 10/2003 | Arquie et al. |
| 7,092,861 | B1 | 8/2006 | Shteyn |
| 7,106,358 | B2 | 9/2006 | Valliath |
| 7,116,350 | B2 | 10/2006 | Allen et al. |
| 7,222,153 | B2 | 5/2007 | Ando et al. |
| 7,227,567 | B1 | 6/2007 | Beck et al. |
| 7,231,592 | B2 | 6/2007 | Humpleman et al. |
| 7,337,217 | B2 | 2/2008 | Wang |
| 7,515,174 | B1 | 4/2009 | Francisco |
| 7,583,587 | B2 | 9/2009 | Qiu et al. |
| 7,607,091 | B2 | 10/2009 | Song |
| 7,720,050 | B1 | 5/2010 | Blank |
| 7,765,294 | B2 | 7/2010 | Edwards et al. |
| 8,300,078 | B2 | 10/2012 | Lovhaugen |
| 8,345,082 | B2 | 1/2013 | Tysso |
| 8,432,431 | B2 | 4/2013 | Gorzynski et al. |
| 8,471,888 | B2 | 6/2013 | George |
| 8,477,177 | B2 | 7/2013 | Larson |
| 8,487,977 | B2 | 7/2013 | Saleh |
| 8,675,067 | B2 | 3/2014 | Chou |
| 8,842,157 | B2 | 9/2014 | Wang |
| 9,143,729 | B2 | 9/2015 | Anand |
| 9,154,732 | B2 | 10/2015 | Guleryuz |
| 9,251,313 | B2 | 2/2016 | Ross |
| 9,298,342 | B2 | 3/2016 | Zhang |
| 9,325,943 | B2 | 4/2016 | Wilson |
| 9,424,678 | B1 | 8/2016 | Enakiev |
| 9,432,625 | B2 | 8/2016 | Delegue |
| 2003/0179770 | A1 | 9/2003 | Reznic et al. |
| 2004/0012613 | A1 | 1/2004 | Rast |
| 2004/0179714 | A1* | 9/2004 | Jouppi ............... H04N 7/144 382/103 |
| 2006/0215650 | A1 | 9/2006 | Wollmershauser et al. |
| 2006/0269278 | A1 | 11/2006 | Kenoyer |
| 2007/0070177 | A1 | 3/2007 | Christensen |
| 2008/0030621 | A1 | 2/2008 | Ciudad |
| 2008/0088698 | A1 | 4/2008 | Patel et al. |
| 2008/0112320 | A1 | 5/2008 | Van Willigenburg |
| 2009/0259746 | A1 | 10/2009 | Sasaki |
| 2010/0177159 | A1 | 7/2010 | Tojo |
| 2010/0262467 | A1 | 10/2010 | Barnhill, Jr. et al. |
| 2011/0025819 | A1 | 2/2011 | Gorzynski |
| 2011/0085530 | A1 | 4/2011 | Hellhake et al. |
| 2011/0102539 | A1 | 5/2011 | Ferren |
| 2011/0117532 | A1 | 5/2011 | Relyea et al. |
| 2011/0169927 | A1 | 7/2011 | Mages |
| 2012/0050323 | A1 | 3/2012 | Bowen |
| 2012/0056971 | A1* | 3/2012 | Kumar ............... H04M 3/567 348/14.02 |
| 2012/0144336 | A1 | 6/2012 | Pinter et al. |
| 2012/0169835 | A1 | 7/2012 | Woo |
| 2012/0192088 | A1 | 7/2012 | Sauriol |
| 2012/0320141 | A1 | 12/2012 | Bowen |
| 2012/0327172 | A1 | 12/2012 | El-Saban et al. |
| 2013/0016099 | A1 | 1/2013 | Rinard |
| 2013/0141519 | A1 | 6/2013 | Sayeed et al. |
| 2013/0176379 | A1 | 7/2013 | Rosenberg et al. |
| 2013/0194375 | A1 | 8/2013 | Michrowski et al. |
| 2013/0265382 | A1* | 10/2013 | Guleryuz ............... H04N 7/15 348/14.08 |
| 2014/0139609 | A1 | 5/2014 | Lu |
| 2015/0244976 | A1 | 8/2015 | Chen |
| 2016/0234475 | A1 | 8/2016 | Courchesne |

FOREIGN PATENT DOCUMENTS

| | | |
|---|---|---|
| WO | WO2006089417 A1 | 8/2006 |
| WO | WO2012059280 A2 | 5/2012 |
| WO | WO2015039239 A1 | 3/2015 |
| WO | WO2016024288 A1 | 2/2016 |
| WO | WO2016077493 A1 | 5/2016 |

OTHER PUBLICATIONS

Kuster, Towards next generation 3D teleconferencing systems, 3DTV-Conference: The True Vision; Capture, Transmission and Display of 3D Video, Oct. 15-17, 2012.

Kurillo, Framework for collaborative real-time 3D teleimmersion in a geographically distributed environment, IEEE International Symposium on Multimedia, Dec. 15-17, 2008, p. 111-118.

Dou, Room-sized informal telepresence system, 2012 IEEE Virtual Reality Workshops (VRW). IEEE, 2012.

Chen, Toward a Compelling Sensation of Telepresence: Demonstrating a portal to a distant (static) office, Proceedings of the conference on Visualization'00. IEEE Computer Society Press, 2000.

* cited by examiner

METHODS, SYSTEMS, AND PRODUCTS FOR TELEPRESENCE VISUALIZATIONS

CROSS REFERENCE TO RELATED APPLICATIONS

This application is a continuation of U.S. application Ser. No. 15/459,990 filed Mar. 15, 2017, which is a continuation-in-part of U.S. application Ser. No. 15/417,421, filed Jan. 27, 2017, now issued as U.S. Pat. No. 10,044,945, which is itself a continuation of U.S. application Ser. No. 14/934,177, filed Nov. 6, 2015, now issued as U.S. Pat. No. 9,591,264, which is itself a continuation of U.S. application Ser. No. 14/067,016, filed Oct. 30, 2013, now issued as U.S. Pat. No. 9,210,377. This application is also related to U.S. application Ser. No. 16/020,230, filed Jun. 27, 2018. The entirety of the aforementioned applications is incorporated herein by reference.

BACKGROUND

Telepresence is important in today's business environment. As team members and customers may be spread around the globe, videoconferencing is an inexpensive means for conducting business. Advances in telepresence techniques enhance videoconferences between remote participants at different locations.

BRIEF DESCRIPTION OF THE DRAWINGS

The features, aspects, and advantages of the exemplary embodiments are better understood when the following Detailed Description is read with reference to the accompanying drawings, wherein.

Figure 1:
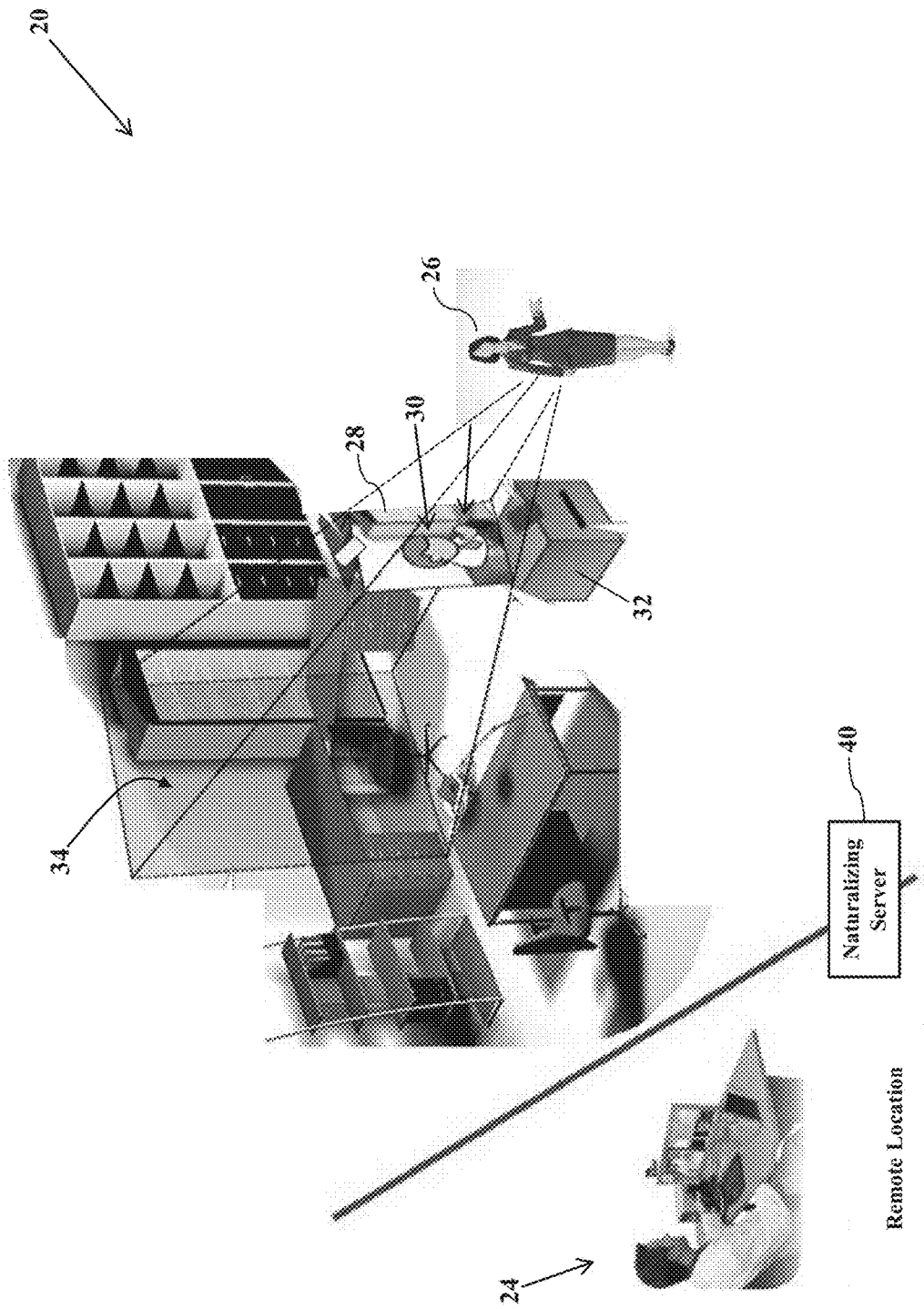
FIG. 1 is a simplified schematic illustrating an operating environment in which exemplary embodiments may be implemented.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIG. 1 is a simplified schematic illustrating an environment in which exemplary embodiments may be implemented. FIG. 1 illustrates a videoconferencing environment 20 for conducting a videoconference 22. As the reader may know, the videoconference 22 allows one or more remote participants 24 to stream video data to one or more fellow conferees 26. The remote participant's image is displayed on a display device 28. Even though the remote participant 24 is not physically located with the other conferees 26, the videoconference 22 allows the remote participant 24 to productively engage the conferee 26 and to contribute to the discussion.

Exemplary embodiments, though, greatly enhance the videoconference 22. The remote participant's video image 30 is still displayed by the display device 28, but here the display device 28 is incorporated into a telepresence robot 32. The telepresence robot 32 is a motorized, mechanized system that displays a naturalized appearance of the remote participant 24. The telepresence robot 32 may be commanded to move about the physical environment (e.g., a conference room), thus changing the direction in which the remote participant's video image is displayed. That is, even though the remote participant 24 is not physically located in the same conference room as the other conferees 26, the telepresence robot 32 moves to display the illusion of the remote participant's presence. Exemplary embodiments, in simple terms, create the illusion of telepresence, in which the remote participant 24 is displayed as being in the same conference room as the other conferees 26. The remote participant's video image 32 is visually displayed on the same background 34 as the physical environment (e.g., the videoconferencing environment 20).

The telepresence illusion is generated in part or in whole by a naturalizing server 40. The naturalizing server 40 is a network-centric, telepresence service for videoconferences. Whenever the videoconference 22 is desired, the video images of the remote participant 24 may be naturalized into the same videoconferencing environment 20. The naturalizing server 40 receives data and video inputs and generates the illusion of the remote participant 24 in the same room as the other conferees 26. The naturalizing server 40 handles most of the processing from a central location, such that client devices are relieved of complex processing tasks. The naturalizing server 40 thus performs any dynamic adaptation to create the illusion, such as scaling, modifying, and synchronizing images, as later paragraphs will explain.

Figure 2:
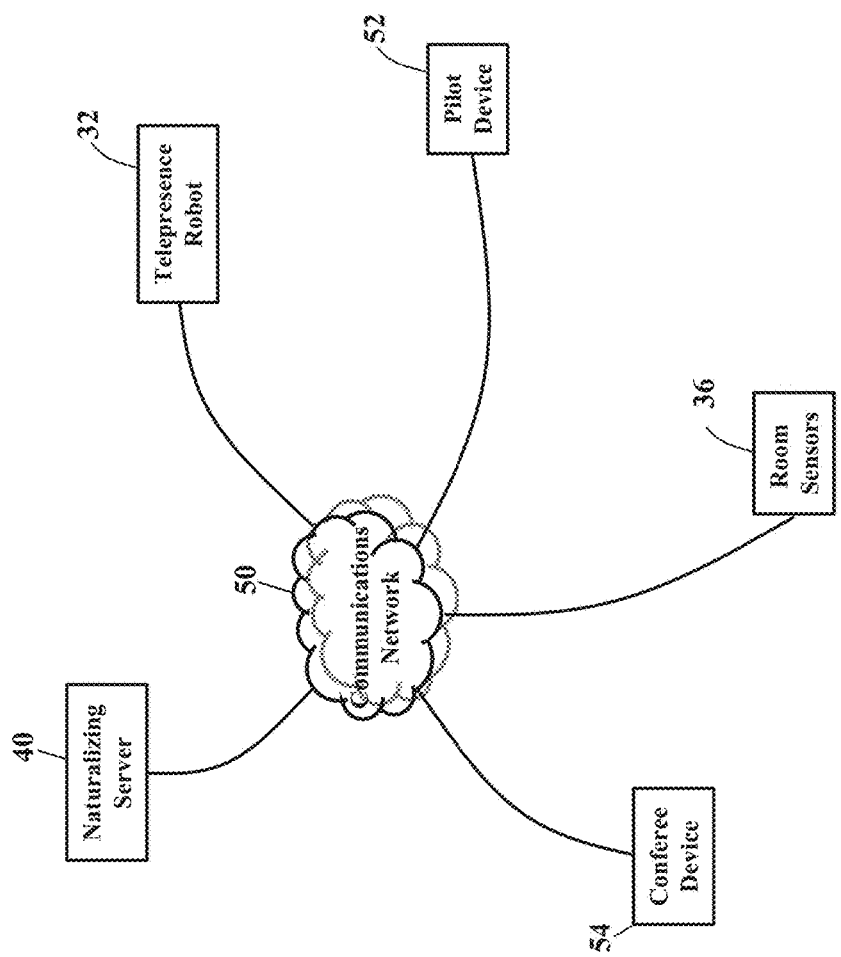
FIG. 2 is a block diagram of the environment in which exemplary embodiments may be implemented.

FIG. 2 is a block diagram of the environment in which exemplary embodiments may be implemented. FIG. 2 illustrates the naturalizing server 40 communicating with various conferencing devices using a communications network 50. The naturalizing server 40, for example, communicates with the telepresence robot 32. The naturalizing server 40 also communicates with the remote participant's pilot device 52. The remote participant uses the pilot device 52 to remotely control the telepresence robot 32 (as later paragraphs will explain). The naturalizing server 40 may also communicate with any of the conferees using their respective conferee device 54. The naturalizing server 40 may also communicate with one or more room sensors 36 present in the videoconferencing environment 20. The naturalizing server 40, the pilot device 52, the conferee device 54, the telepresence robot 32, and the room sensors 36 may thus query and communicate with each other to generate the telepresence illusion, as later paragraphs will explain.

Figure 3:
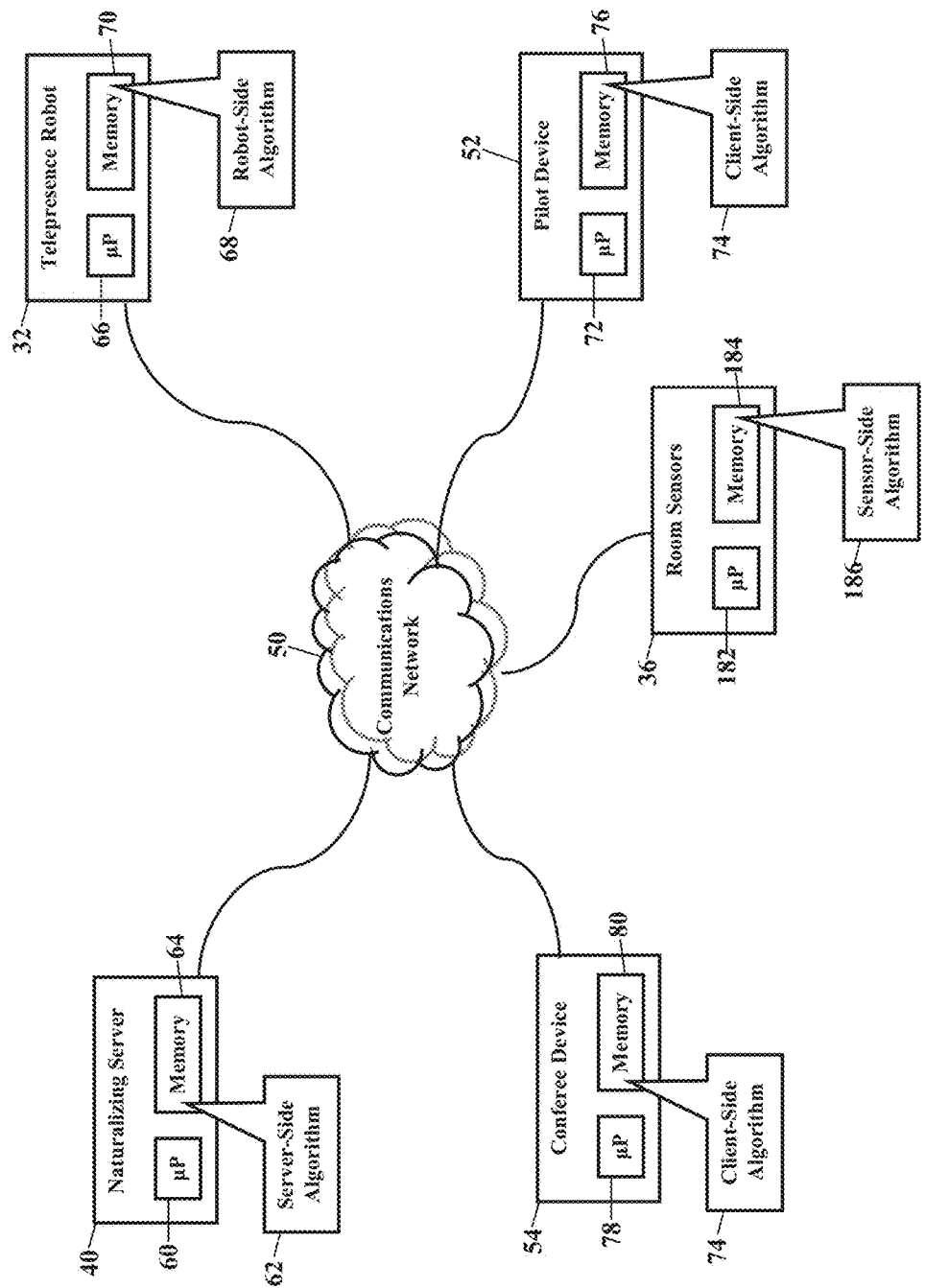
FIGS. 3-4 are more detailed block diagrams of the environment in which exemplary embodiments may be implemented.

FIG. 3 is a more detailed block diagram of the environment in which exemplary embodiments may be implemented. The naturalizing server 40 has a processor 60 (e.g., "μP"), application specific integrated circuit (ASIC), or other component that executes a server-side telepresence algorithm 62 stored in a memory 64. The telepresence robot 32 has a processor 66 (e.g., "μP"), application specific integrated circuit (ASIC), or other component that executes a robot-side telepresence algorithm 68 stored in a memory 70. The remote participant's pilot device 52 has a processor 72 (e.g., "μP"), application specific integrated circuit (ASIC), or other component that executes a client-side telepresence algorithm 74 stored in a memory 76. The conferee device 54 also has a processor 78 (e.g., "μP"), application specific integrated circuit (ASIC), or other component that executes the client-side telepresence algorithm 74 stored in a memory 80. The room sensors 36 also have a processor 182 (e.g., "μP"), application specific integrated circuit (ASIC), or other component that executes a room sensor-side telepresence algorithm 186 stored in a memory 184. The server-side telepresence algorithm 62, the robot-side telepresence algorithm 68, the client-side telepresence algorithm 74, and the room sensor-side telepresence algorithm 186 are thus sets of programming, code, or instructions that cooperate with robot-side telepresence algorithm 68 to generate the telepresence illusion. The central naturalizing server 40 thus provides network-centric telepresence functions and/or services for videoconferences.

Exemplary embodiments may be applied regardless of networking environment. Any networking technology may be used to establish communication between the telepresence robot 32, the naturalizing server 40, the remote participant's pilot device 52, the conferee device 54, and the room sensors 36. The communications network 50, for example, may be a wireless network having cellular, WI-FI®, and/or BLUETOOTH® capability. The networking environment may utilize near-field (short distance) or far-field (long distance) techniques. The networking environment may operate using the radio-frequency domain and/or the Internet Protocol (IP) domain. The networking environment may even include a distributed computing network, such as the Internet (sometimes alternatively known as the "World Wide Web"), an intranet, a local-area network (LAN), and/or a wide-area network (WAN). The networking environment may include physical connections, such as USB cables, coaxial cables, copper wires, fiber optic lines, and/or hybrid-coaxial lines. The communications network 50 may utilize any portion of the electromagnetic spectrum and any signaling standard (such as the IEEE 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 4:
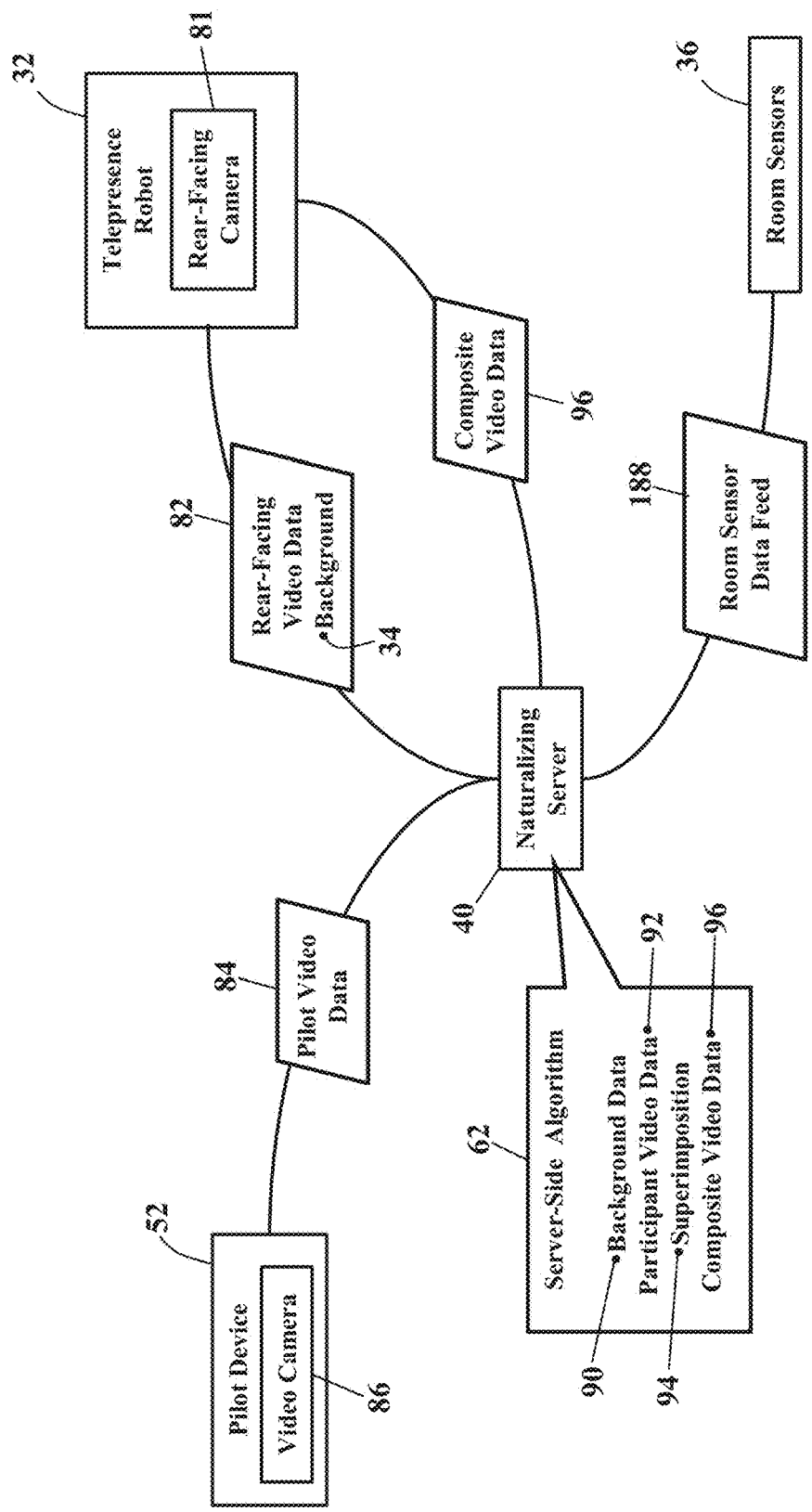

FIG. 4 is a more detailed block diagram of the operating environment. The telepresence robot 32 has a rear-facing camera 81 that captures analog or digital, still or video images of the conferencing environment (illustrated as reference numeral 20 in FIG. 1). The telepresence robot 32 thus sends rear-facing video data 82 to a network address associated with the naturalizing server 40. The telepresence robot 32, for example, may capture still images or video data of the background view 34 behind the telepresence robot 32 (e.g., the sight shadow of the telepresence robot). The telepresence robot 32 sends the rear-facing video data 82 to the naturalizing server 40 for processing. In some embodiments, the telepresence robot 32 sends location information to the naturalizing server 40, which may include global positioning system (GPS) location data, or triangulation data based on radio frequency signals (e.g., Wi-Fi, cellular, or Bluetooth signals). In some embodiments, the telepresence robot 32 may send a location identifier associated with the conferencing environment 20 to the naturalizing server 40, which in response may retrieve cached still images or sensor data corresponding to the location identifier and videoconferencing environment 20. For example, the naturalizing server 40 may store a point cloud map of sensor data for a conferencing environment 20 in association with the conferencing environment 20 location information, and may access the point cloud map responsive to receiving location information for the conferencing environment.

The room sensors 36 may capture a point cloud map of sensor data representing the videoconferencing environment 20 and send a room sensor data feed 188 to the naturalizing server 40 for processing. In some embodiments, light detection and ranging (LIDAR) sensors may be used as one or more room sensors. In some embodiments, photogrammetry sensors may be used as the one or more room sensors. In some embodiments, the LIDAR and/or photogrammetry sensors provide a point cloud map input as a room sensor data feed 188 to the naturalizing server 40 for processing. In some embodiments, additional room sensors may include optical sensors, acoustic sensors, and proximity sensors. Other sensors may include lasers which periodically scan the videoconferencing environment 20. In some embodiments, the room sensor data feed is a continuous feed of data transmitted during a videoconference. In some embodiments, room sensor data may be a smaller amount of data than video or still image data sent from the telepresence robot 32, which accordingly reduces the amount of data transmitted over a network to naturalizing server 40. In one embodiment, multiple room sensors 36 may be utilized. For example, room sensors 36 may be placed in two or more corners of a videoconferencing environment 20 to capture sensor data representative of the videoconferencing environment 20.

In some embodiments, room sensor data, such as a point cloud map input, is transmitted to the naturalizing server 40 at a first time, such as a time of initial installation (e.g. when the room sensor is installed or placed within the videoconferencing environment). Additionally, image data of the videoconferencing environment 20 captured from the rear-facing camera 81 may be transmitted to the naturalizing server 40 at the first time. The room sensor data and image data transmitted to the naturalizing server 40 at the first time may be cached by the naturalizing server and associated with location data of the videoconferencing environment 20. In some embodiments, the naturalizing server 32 may use the received location information from the telepresence robot 32 to retrieve cached room sensor data for the videoconferencing environment.

In some embodiments, a current version of the room sensor data, such as a current point cloud map input, may be transmitted to the naturalizing server, for example, at a second, later time near or at the commencement of a videoconference. In some embodiments, the current version of the room sensor data comprises a differential update of the room sensor data, as compared to the initial transmission of room sensor data. Thus, in some embodiments, the room sensor-side telepresence algorithm 184 includes the computation of a delta between the initial transmission of room sensor data and the current transmission of room sensor data, and transmitting only the delta between the two sets of room sensor data. Transmission of a delta reduces the amount of data to be transmitted to the naturalizing server, as the naturalizing server may cache the initial version of the room sensor data and use the delta to determine the current room sensor data. Further, in some embodiments described below, the current version of the room sensor data transmitted at the second time may be used in conjunction with cached image data received at the first time to perform naturalization. In some embodiments, a combination of cached image data, cached sensor data, and current sensor data may be used as described below to perform naturalization.

In some embodiments, data captured by the room sensors 36 may include gaze data for a conferee, or data which may be used to determine a gaze of a conferee. That is, data captured by the room sensors 36 may be analyzed to determine a direction or angle at which the conferee is viewing the telepresence robot. Such data can be used to more accurately perform the naturalization of the remote participant's image at the correct size and scale in accordance with the detected gaze. Further, gaze data may assist in determining what portion of the physical environment is being blocked by the telepresence robot 32. In some embodiments, gaze detection may be performed by room sensor-side telepresence algorithm 184 in real-time during a videoconference.

In some embodiments, the naturalizing server 40 may also receive sensor data from a conferee device 54 possessed by the conferee 26 (e.g. held by or on the person of (e.g. in a pocket) the conferee 26). For example, conferee devices 54 such as mobile devices possessed by conferees may include cameras or other imaging devices, accelerometers, gyroscopes, barometric sensors, and other sensors which may generate data which can be used by naturalizing server 40 to perform naturalization. In addition, wireless network capabilities and positional sensors of the conferee device 54 may be used to determine a direction the conferee is facing, which may be used by the naturalizing server to perform the naturalization. For example, Bluetooth technology may be used to determine the location of a conferee within a videoconferencing environment, and may be used in conjunction with rear-facing video data 82 and the room sensor data feed 188 to accurately depict the videoconferencing environment behind the telepresence robot by capturing a background view 34 and room sensor data 188 representative of the portion of the videoconferencing environment viewed by the conferee (i.e., the portion of the videoconferencing environment (e.g. walls, distinguishing features, etc.) in front of the conferee and behind the telepresence robot).

In some embodiments, the conferee device 54 may be an augmented reality device, such as an augmented reality head mounted display. Thus, sensors of the conferee device 54 (e.g., accelerometers, gyroscope, eye tracking sensors, etc.) may be used for performing gaze detection of the conferee's eyes, which may be used by the naturalizing server to perform the image replacement. Sensors may also be incorporated into other objects within the conferencing environment 20 or on the person of the conferee 26 himself or herself. For example, a conferee 26 may be wearing an identification badge with one or more built-in sensors, or pieces or jewelry containing sensors. In some embodiments, sensors of the conferee device 54 may be used to determine a location of the conferee 26 within the videoconferencing environment 20, which may be transmitted to the naturalizing server 40 to perform naturalization in accordance with the determined conferee location.

The naturalizing server 40 may also receive pilot video data 84 of the remote participant. FIG. 4 illustrates the remote participant's pilot device 52 having a video camera 86 that captures the pilot video data 84. The remote participant's pilot device 52 also sends the pilot video data 84 to the network address of the naturalizing server 40.

Naturalization is performed. In some embodiments, as described herein, images of the videoconferencing environment (whether full motion video, still images, or a combination thereof) and room sensor data are used for naturalization, and may be referred to collectively as videoconferencing environment data. In order to create the illusion, the remote participant's image is superimposed onto the background view 34 behind the telepresence robot 32. When the naturalizing server 40 receives the pilot video data 84, the server-side algorithm 62 distinguishes between the remote participant's human image and her background data 90, that is, the background portion of the remote participant's video. The naturalizing server 40 identifies and removes the background data 90, leaving only participant video data 92 of the remote participant's human face, head, or torso. The participant video data 92 of the remote participant's human face, head, or torso may be referred to as a foreground portion of the pilot video data 84. The naturalizing server 40 stores the resulting participant video data 92 in its memory (illustrated as reference numeral 64 in FIG. 3). The naturalizing server 40 then retrieves the rear-facing video data 82 of the background view 34, as well as the room sensor data feed 188, and performs superimposition 94. That is, the naturalizing server 40 superimposes or overlays the participant video data 92 onto the rear-facing video data 82 to generate composite video data 96. In other words, the dynamic video images of the remote participant's human torso are combined with the background view 34 (behind the telepresence robot 32), thus generating the illusion of telepresence. In some embodiments, the room sensor data feed 188 is used by the naturalizing server 40 to superimpose or overlay the participant video data 92 onto the rear-facing video data 82 to generate the composite video data 96. That is, the room sensor data feed 188 may be used to determine the portion of the videoconferencing environment behind the display device (i.e., the background view 34 behind the telepresence robot 32) to generate the illusion of telepresence by superimposition of the participant video data 92. As described above, in some embodiments, a current version of room sensor data is transmitted to the naturalizing server 40, which may use cached, previously-received sensor data to perform the naturalization and generate the composite video data 96. While exemplary embodiments may use any technique to create the illusion, the known "green screen" Chroma key compositing technique is perhaps simplest and least expensive. The remote participant 24 sits before a single chromatic background, which is later chromatically recognized and removed. Regardless of the technique, once the illusion is generated, the naturalizing server 40 sends the composite video data 96 to a network address associated with the telepresence robot 32. The telepresence robot 32 displays the composite video data 96, wherein the remote participant 24 is visually presented in the same videoconferencing environment 20.

Figure 5:
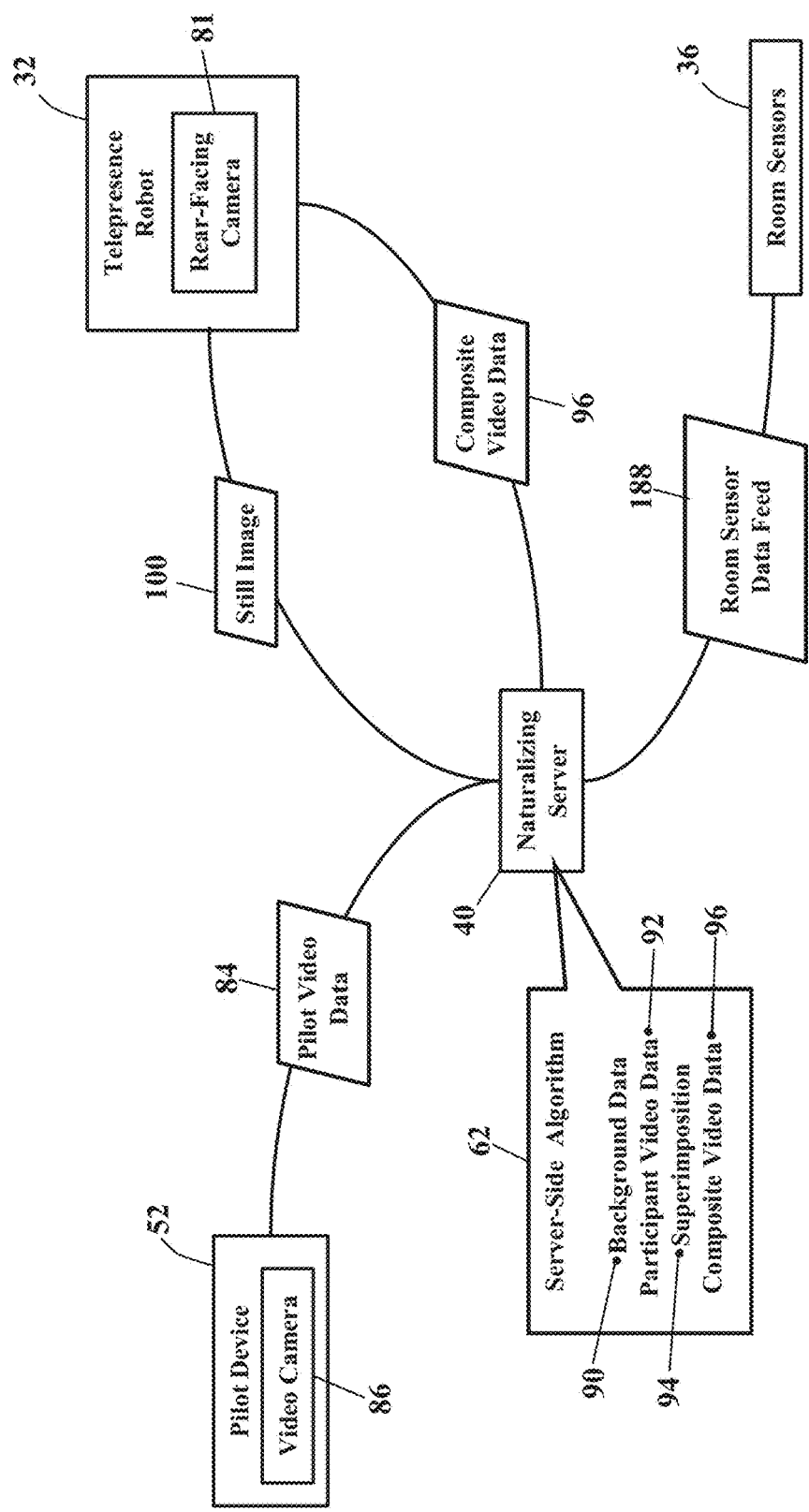
FIG. 5 is a diagram illustrating a lesser complex visualization, according to exemplary embodiments.

FIG. 5 is a diagram illustrating a lesser complex visualization, according to exemplary embodiments. Instead of capturing full motion video, here the telepresence robot's rear-facing camera 81 only captures a still image 100 of the conferencing environment (illustrated as reference numeral 20 in FIG. 1). The telepresence robot 32 sends the still image 100 to the naturalizing server 40. In addition, the room sensors 36 send room sensor data feed 188 to the naturalizing server 40. In some embodiments, the room sensors 36 send a complete set of room sensor data to the naturalizing server 40. In some embodiments, the room sensors 36 send a differential update of room sensor data to the naturalizing server 40. The naturalizing server 40 still receives the pilot video data 84 of the remote participant and still removes her background data 90, leaving only the participant video data 92 of the remote participant's human face, head, or torso. Because a much smaller and simpler still image 100 is retrieved (instead of full motion video), the naturalizing server 40 only needs to superimpose the participant video data 92 onto the still image 100 of the conferencing environment 20 to generate the composite video data 96. The superimposition 94 is thus less complex and faster. However, with the room sensor data feed 188, the superimposition 94 can still accurately represent the portion of the videoconferencing environment behind the telepresence robot, without requiring full motion video to be sent to the naturalizing server. As above, the room sensor data feed 188 may be used to determine the portion of the videoconferencing environment behind the display device (i.e., the background view 34 behind the telepresence robot 32) to generate the illusion of telepresence by superimposition of the participant video data 92. Moreover, less network resources are required to send the still image 100, and less network resources are required to send the composite video data 96 to the telepresence robot 32 for display. Further, in some embodiments, the naturalizing server 40 retrieves from a memory or storage a cached version of still image 100 of the videoconferencing environment 20, further reducing the network resources required for naturalization.

In some embodiments, the telepresence robot 32 may send metadata to the naturalizing server 40 indicative of the location of the telepresence robot 32 within the conferencing environment 20, and location and/or gaze data associated with the conferee 26. Gaze data of the conferee 26 may identify the direction in which the conferee is looking, to determine an image of the videoconferencing environment corresponding to the gaze of the conferee (e.g., the portion of the video conferencing environment in front of the conferee's gaze) used for naturalization. The naturalizing server 40 may retrieve from a memory or storage a cached version of still image 100 of the conferencing environment and room sensor data, and utilize the metadata transmitted from the telepresence robot 32 to perform the naturalization, such that the portion of the videoconferencing environment used in the naturalization is included in the composite video data 96. Accordingly, as only metadata may be transmitted over the network, fewer network resources are required for naturalization.

In some embodiments, reducing the amount of network resources required for naturalization results in an improved user experience to the conferee 26. For example, reducing the amount of network resources required for naturalization reduces the latency which occurs between sending data to the naturalization server 40 and receiving composite video data 96 from the naturalization server. In some embodiments, latency may also be reduced by changing the geographic location of the naturalization server 40. For example, in an edge cloud architecture, naturalization servers 40 may be located geographically close to a videoconferencing environment 20. As one example, naturalization servers 40 may be co-located with a cellular tower, or at a central office of a telecommunications operator.

FIGS. 6-11 are schematics illustrating visual updates, according to exemplary embodiments. Here, exemplary embodiments may need to update the background view 34, depending on various factors. Should the background view 34 (behind the telepresence robot 32, as FIG. 1 illustrates) change, exemplary embodiments may update the background view 34 to maintain the illusion of telepresence. FIGS. 6-11 are described with reference to movement of the telepresence robot 32; however, movement of the conferee 26 may also cause visual updates to be necessary.

Figure 6:
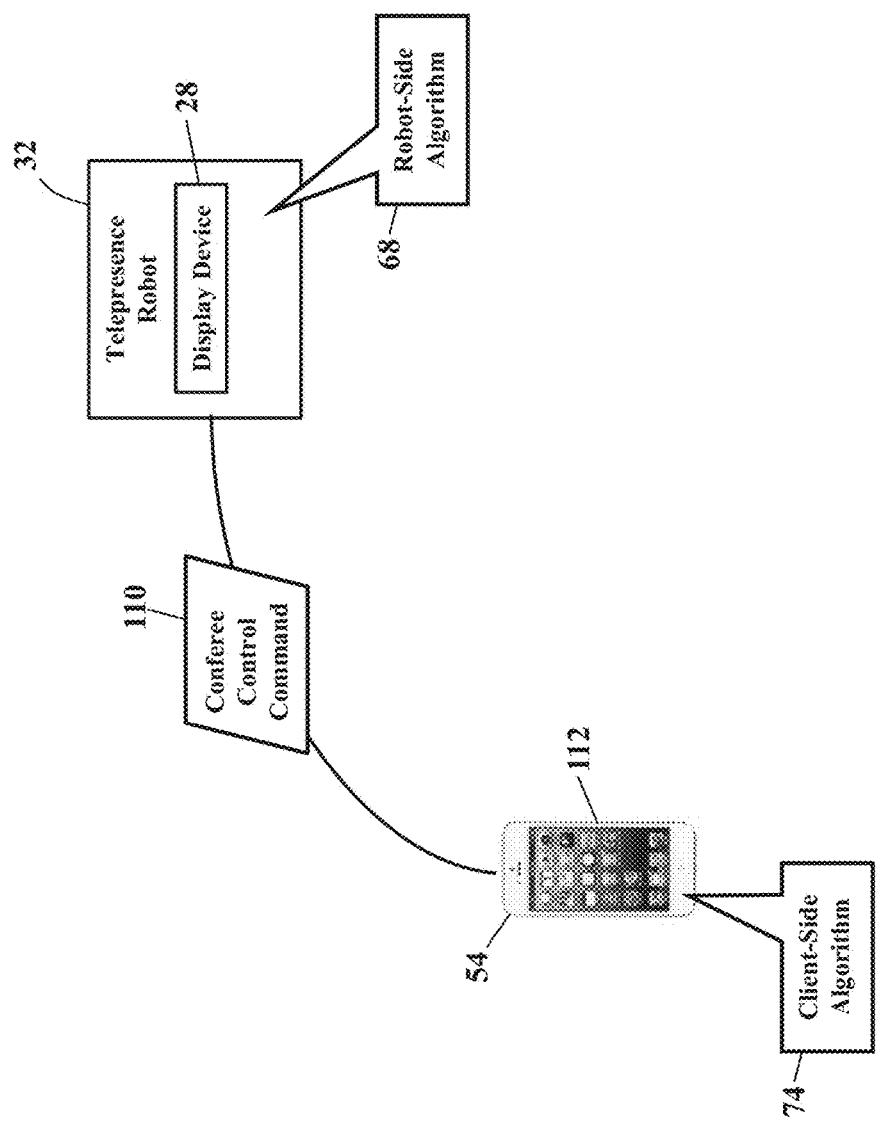
FIGS. 6-11 are schematics illustrating visual updates, according to exemplary embodiments.

FIG. 6, for example, illustrates conferee control commands 110. As the videoconference 22 proceeds, some conferees (illustrated as reference numeral 26 in FIG. 1) may be unable to clearly view the display device (illustrated as reference numeral 28 in FIG. 1) on the telepresence robot 32. The conferee 26 may thus want to turn or move the telepresence robot 32 for a different viewing angle. Because the telepresence robot 32 is motorized, the telepresence robot 32 may be commanded to move and turn to suit different viewing directions. The conferee 26, using her conferee device 54, may thus issue the conferee control commands 110 that instruct the telepresence robot 32 to move to a new position or location. While the conferee device 54 may be any processor-controlled device, FIG. 6 illustrates the conferee device 54 as a mobile, wireless smartphone 112 that executes the client-side algorithm 74. The conferee 26 makes inputs to the conferee device 54, and the client-side telepresence algorithm 74 causes the smartphone 112 to send the conferee control commands 110. When the telepresence robot 32 receives the conferee control commands 110, the robot-side algorithm 68 interprets and executes the conferee control commands 110 and instructs the telepresence robot 32 to move to the conferee's desired location.

Figure 7:
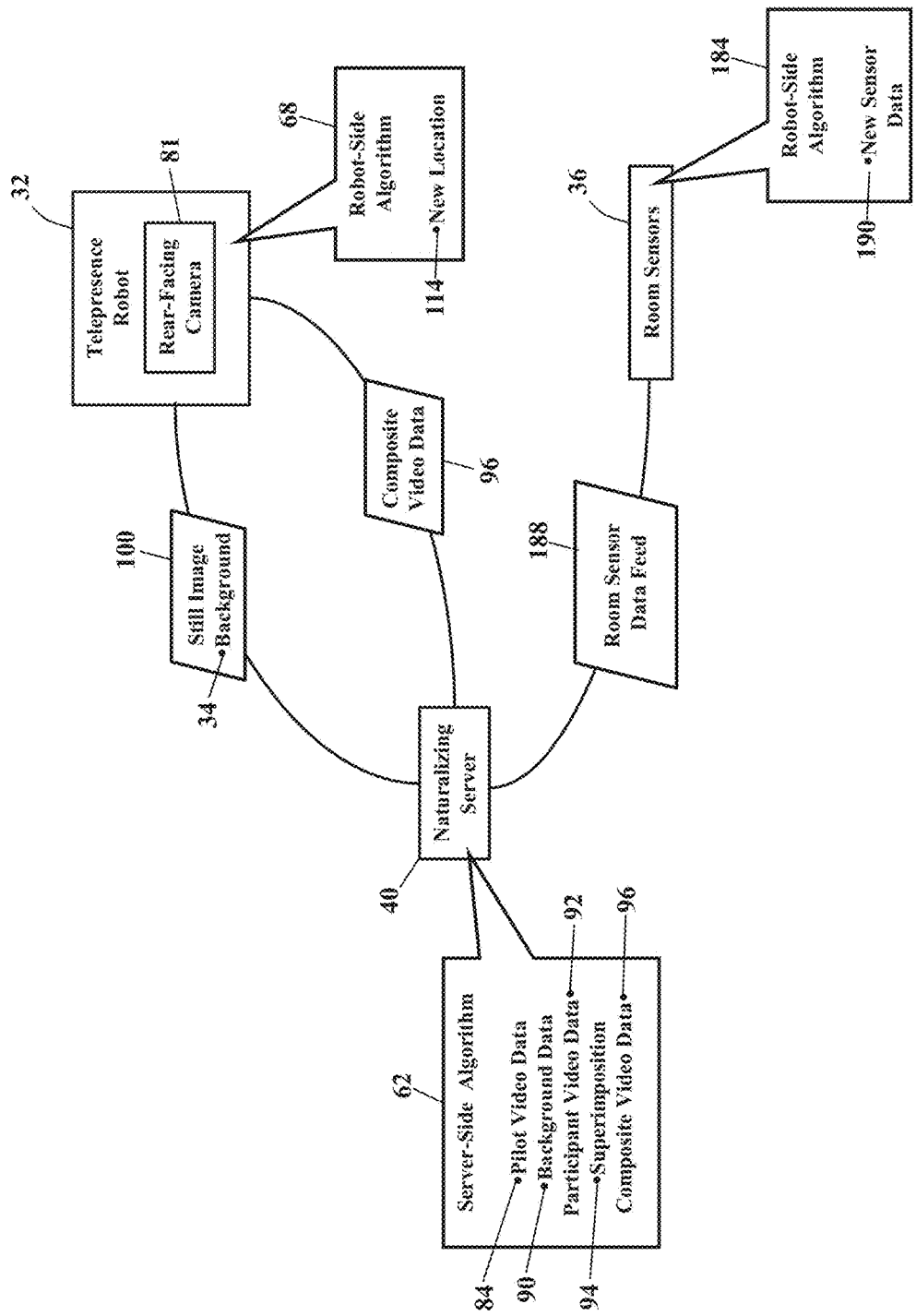

As FIG. 7 illustrates, the new location may require an update. When the telepresence robot 32 moves to any new location 114, the background view 34 (behind the telepresence robot 32, as FIG. 1 illustrated) likely changes. So, when the telepresence robot 32 changes position, the telepresence robot 32 may capture and send a new still image 100 to the naturalizing server 40. In addition, the room sensors 36 send an updated room sensor data feed 188 to the naturalizing server 40. In some embodiments, the room sensors 36 send a complete set of room sensor data to the naturalizing server 40. In some embodiments, the room sensors 36 send a differential update of room sensor data to the naturalizing server 40. Further, conferee devices 56 may also send sensor data to the naturalizing server 56. The naturalizing server 40 may discard old, stale environmental image(s) and/or room and conferee device sensor data, superimposes the participant video data 92 onto the updated, still image 100, thus generating new composite video data 96. The naturalizing server 40 sends the new composite video data 96 to the telepresence robot 32, wherein the remote participant 24 is visually presented in the new background view 34, due to the new location 114.

Figure 8:
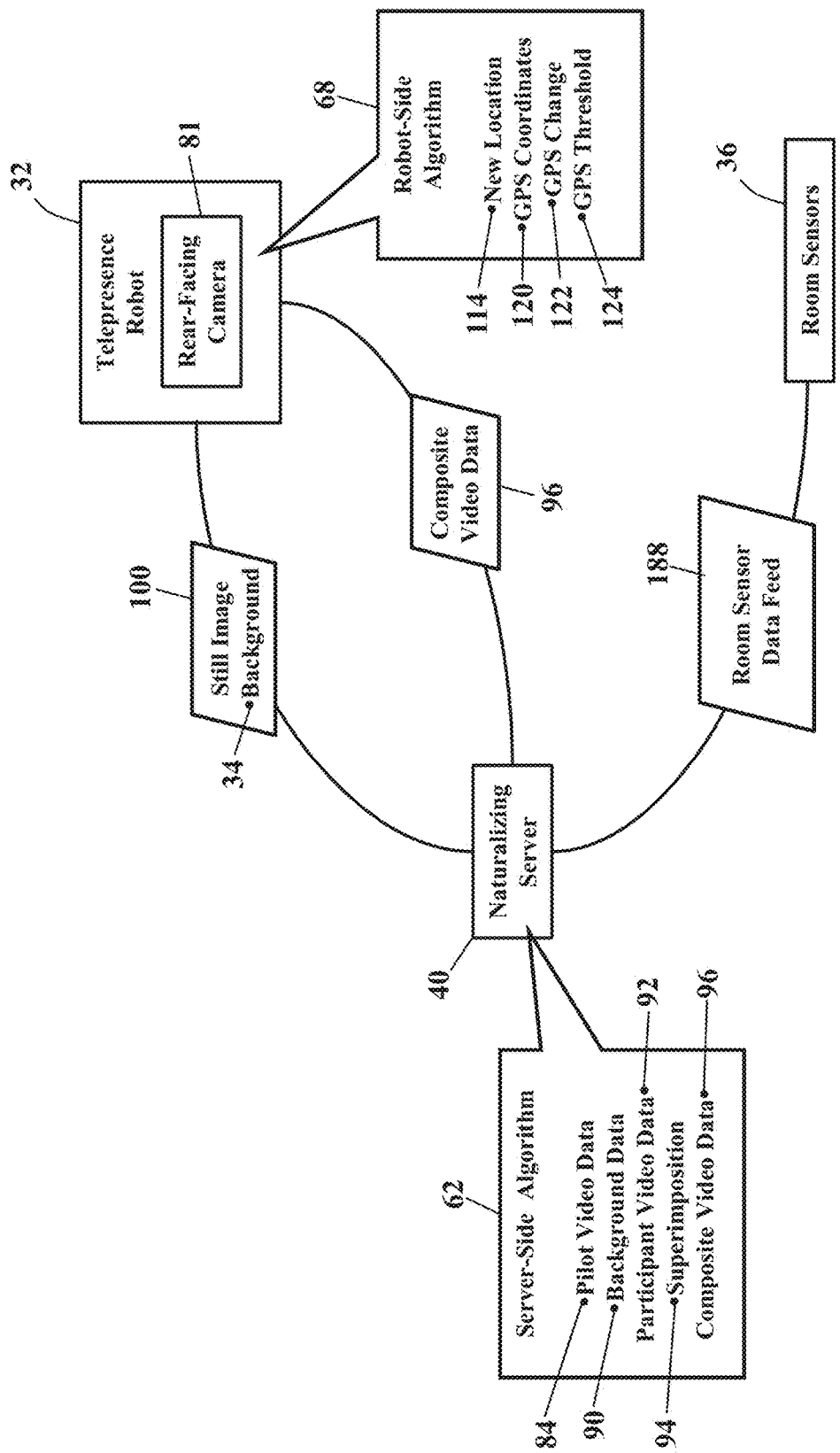

FIG. 8 illustrates Global Positioning System ("GPS") coordinates 120. The telepresence robot 32 may have a GPS system or receiver that generates the Global Positioning System coordinates 120. When the telepresence robot 32 moves to the new location 114, exemplary embodiments may determine a locational GPS change 122 in the Global Positioning System coordinates 120. That is, the client-side algorithm 74 may compare a previous location to the new location 114 and determine the GPS change 122 in the Global Positioning System coordinates 120. The GPS change 122 may be compared to a threshold change 124. If the GPS change 122 fails to exceed the threshold 124, then perhaps no background update is needed. However, if the GPS change 122 exceeds the threshold 124, the telepresence robot 32 may be instructed to send a new still image 100 of the background view 34. Other positioning systems may also be used by the telepresence robot 32. In addition, in some embodiments, the room sensors 36 may be instructed to send room sensor data feed 188 to the naturalizing server 40. In some embodiments, the room sensors 36 send a complete set of room sensor data to the naturalizing server 40, while in some embodiments, the room sensors send a differential update of room sensor data to the naturalizing server 40. Further, as described above, conferee devices 56 may also send sensor data to the naturalizing server. The naturalizing server 40 may discard old, stale environmental image(s) and/or room and conferee device sensor data, and superimposes the participant video data 92 onto the updated, still image 100, thus generating new composite video data 96. The naturalizing server 40 sends the new composite video data 96 to the telepresence robot 32, wherein the remote participant 24 is visually presented in the new background view 34, due to the change 122 in the Global Positioning System coordinates 120.

Any other location technology may be used. As the telepresence robot 32 moves about the conferencing environment 20, the telepresence robot 32 may have any receiver that uses triangulation to determine location. Cellular signals and WI-FI® signals, for example, are common signals that may used to triangulate locations. The location of the telepresence robot 32 may also be determined using motion sensors, such as ultrasonic and infrared sensors. In some embodiments, Bluetooth beacons may be used to determine the position of a telepresence robot 32. If the telepresence robot 32 becomes associated with a new Bluetooth beacon, the telepresence robot 32 may be instructed to send a new still image 100 of the background view 34, and the room sensors may likewise be instructed to send updated room sensor feed data. Moreover, as the telepresence robot 32 is commanded to move, the commands may be analyzed to determine location. Indeed, exemplary embodiments may be adapted to utilize any technique or technology for determining the location of the telepresence robot 32.

Figure 9:
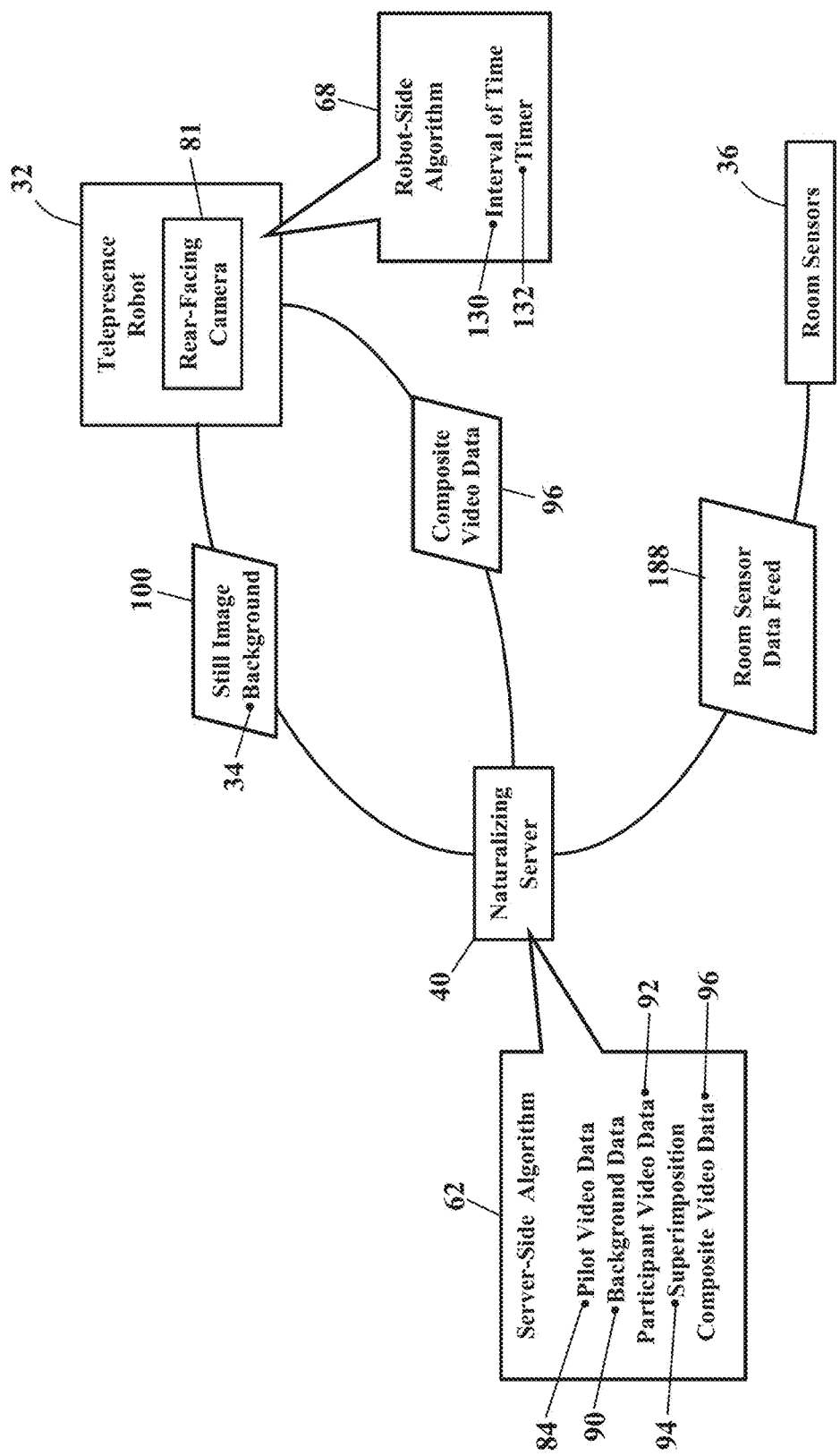

FIG. 9 illustrates periodic updates. Here exemplary embodiments may update the background view 34 (behind the telepresence robot 32) and room sensor data feed 188 according to any interval 130 of time. Exemplary embodiments may assume that the background view 34 will change with time, especially because the telepresence robot 32 is mobile. Exemplary embodiments may thus establish a timer 132 according to the interval 130 of time. The timer 132 begins counting down from an initial value. When the timer 132 counts down to its final value, the client-side algorithm 74 may instruct the telepresence robot 32 to activate the rear-facing camera 81 and automatically capture the new still image 100. In addition, the room sensors 36 send an updated room sensor data feed 188 to the naturalizing server 40. In some embodiments, the room sensors 36 send a complete set of room sensor data to the naturalizing server 40, while in some embodiments, room sensors 36 send a differential update of room sensor data to the naturalizing server 40. Further, conferee devices 56 may also send sensor data to the naturalizing server 56. When the naturalizing server 40 receives the new still image 100, the naturalizing server 40 discards the old, stale environmental image(s) and room sensor data and superimposes the participant video data 92 onto the still image 100, thus again generating the new composite video data 96. The naturalizing server 40 sends the new composite video data 96 to the telepresence robot 32, wherein the remote participant 24 is visually presented in the new background view 34. The telepresence robot 32 may be configured with any interval 130 of time that a participant desires.

Figure 10:
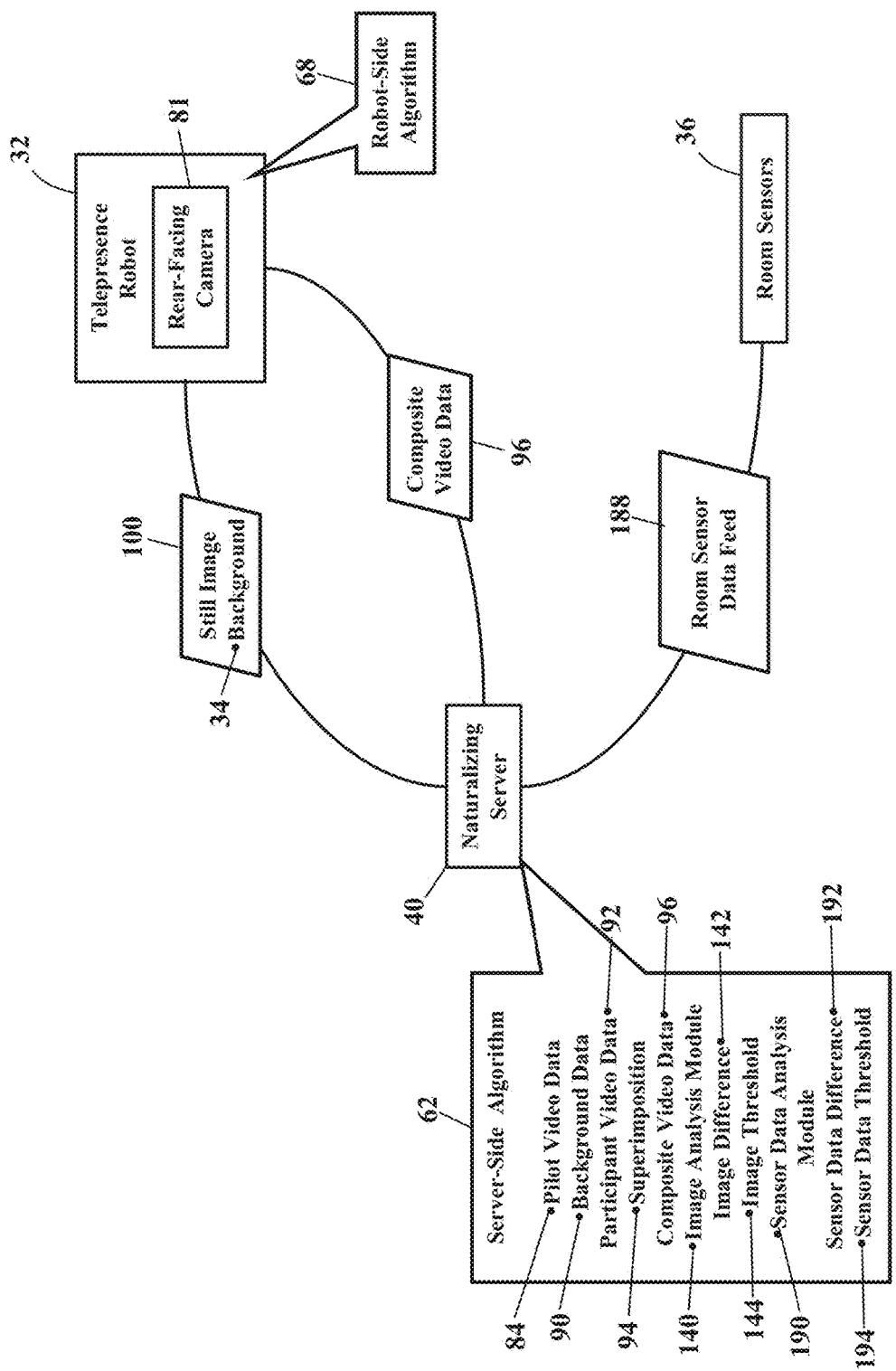
Figure 11:
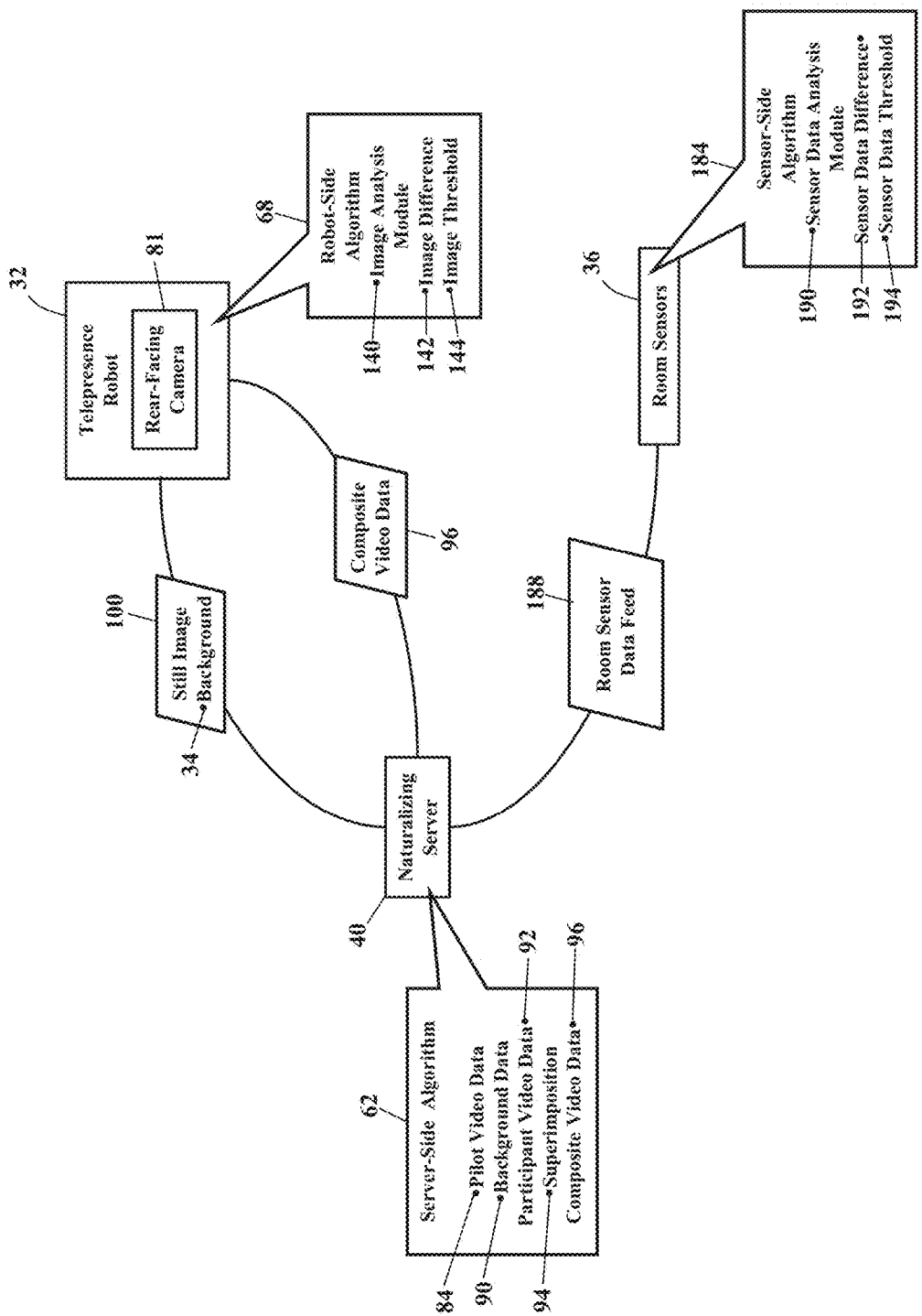

FIGS. 10-11 illustrate image analysis. Here exemplary embodiments may update the background view 34 (behind the telepresence robot 32) whenever visual changes are noticed. FIG. 10, for example, illustrates the naturalizing server 40 conducting the image analysis. Here the telepresence robot 32 may periodically or randomly send its still image 100 to the naturalizing server 40. The naturalizing server 40 calls an image analysis module 140 that compares one or more historical environmental still images to the newly-received rear-facing still image 100. If no difference is determined, then there may be no need or requirement for an update. However, should the image analysis module 140 determine an image difference 142 that exceeds an image threshold 144, then a background update may be performed.

Exemplary embodiments may discard the historical environmental image and replace with the newly received still image 100. The image analysis module 140 may determine changes in motion, color, and/or any other image analysis technique. In some embodiments, telepresence robot 32 may send a front-facing still image or video to the naturalizing server to determine the conferee's gaze. When a change in the conferee's gaze is detected, the telepresence robot 32 may be instructed to update the rear-facing still image 100 to include the portion of the videoconferencing environment in corresponding to the conferee (e.g., in front of the conferee's gaze), such that naturalization may occur in accordance with the detected change in conferee gaze. In some embodiments, the naturalizing server 40 calls a sensor data analysis module 190 that compares historical environmental sensor data to newly-received sensor data 188. If no difference is determined, there may be no need or requirement for an update. However, should sensor data analysis module 190 determine a sensor data difference 192 that exceeds a sensor data threshold 194, then a background update may be performed and new sensor data 188 utilized.

In FIG. 11, the telepresence robot 32 performs the image analysis. Here the telepresence robot 32 may store and compare old, historical and new still images 100. The telepresence robot 32 may periodically or randomly capture its still image 100. The telepresence robot 32 calls the image analysis module 140 to perform the comparison. If no difference is determined, then there may be no need or requirement for an update. However, should the image analysis module 140 determine that the image difference 142 exceeds the threshold 144, then a background update may be performed. Exemplary embodiments may discard the historical environmental image and replace with the newly received still image 100. Again, any image analysis technique may be used. As previously described with reference to FIG. 10, sensor data analysis may be performed as well as, or instead of, image analysis. In FIG. 11, the telepresence robot 32 may perform the sensor data analysis. In some embodiments, sensor data analysis and image analysis may be performed cooperatively between telepresence robot 32 and the naturalizing server 40. Likewise, sensor data analysis, in some embodiments, may be performed by a room sensor-side algorithm 184 of room sensors 36.

Figure 12:
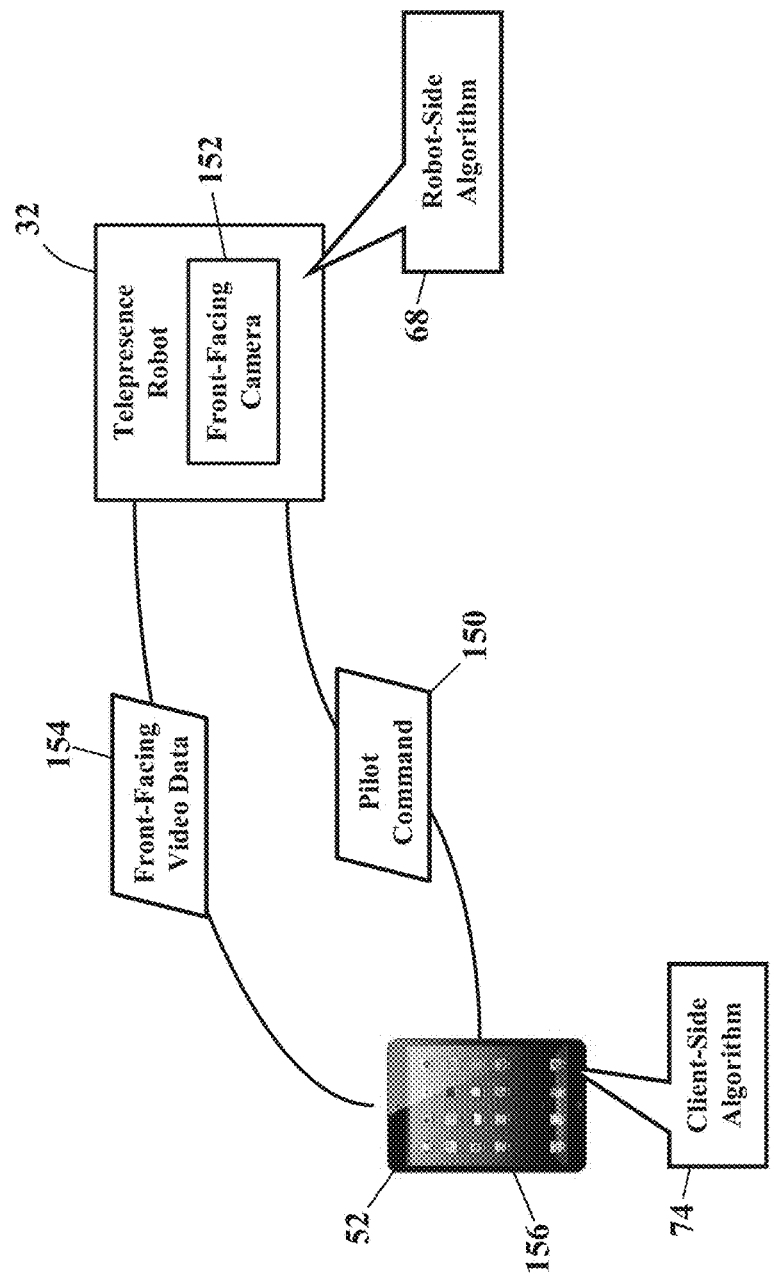
FIGS. 12-13 are schematics illustrating pilot commands, according to exemplary embodiments.
Figure 13:
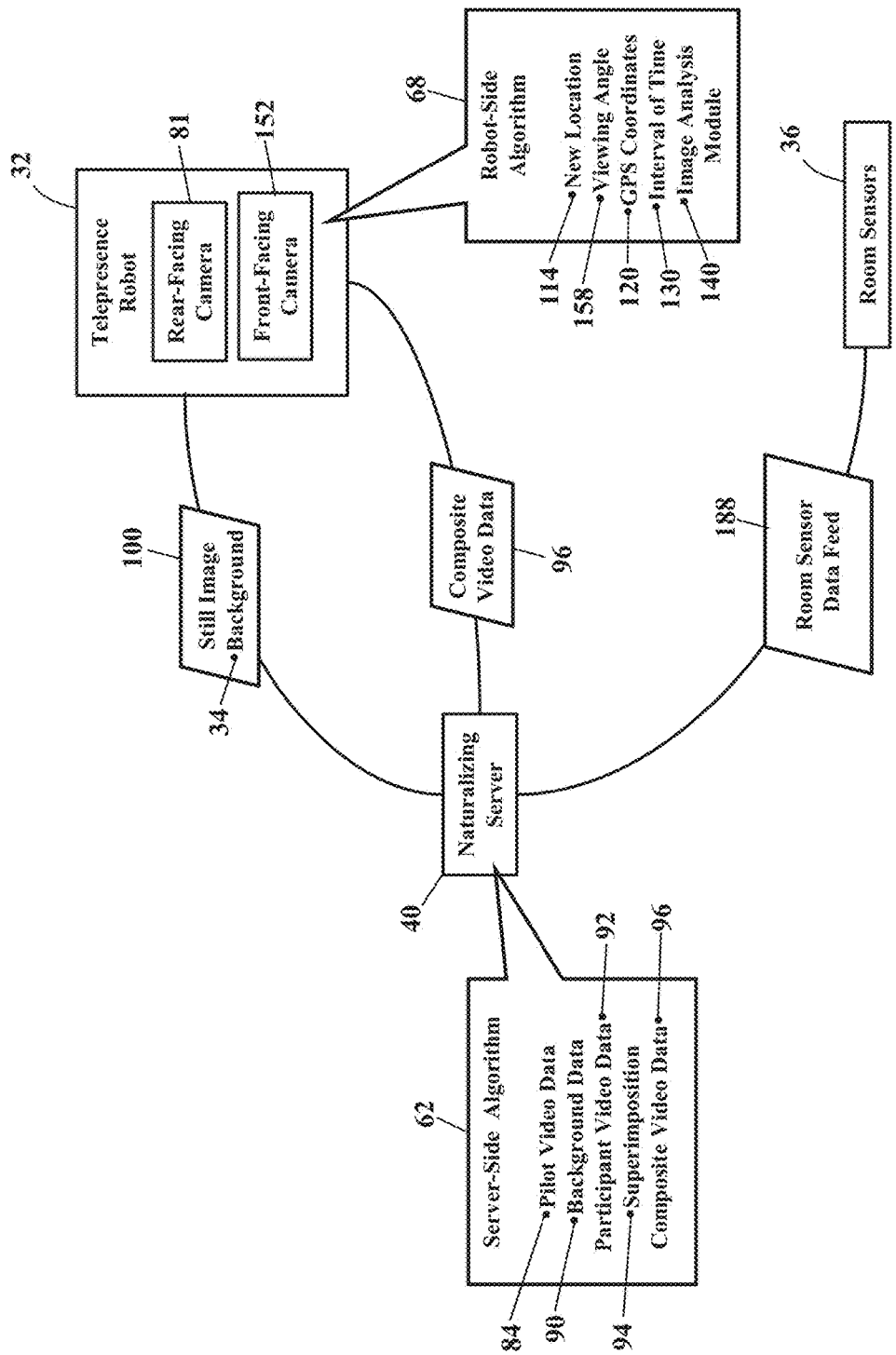

FIGS. 12-13 are schematics illustrating pilot commands 150, according to exemplary embodiments. Here, the remote participant's pilot device 52 may also control the location of the telepresence robot 32. As FIG. 12 illustrates, the telepresence robot 32 may have a front-facing camera 152 that captures analog or digital, front-facing video data 154 in some frontal direction. The telepresence robot 32 certainly may capture still images, but most remote participants will want the front-facing camera 152 aimed at one of the fellow conferees to capture video of speech and movements. The front-facing video data 154 is sent to a network address associated with the remote participant's pilot device 52. While the pilot device 52 may be any processor-controlled device, FIG. 12 illustrates a mobile tablet computer 156 executing the client-side algorithm 74. The remote participant 24 may thus move the telepresence robot 32 to keep the front-facing camera 152 trained on other conferees 26. As different conferees 26 speak, the remote participant 24 may instruct the telepresence robot 32 to move and turn to suit different frontal directions. The remote participant makes inputs to the pilot device 52, and the client-side telepresence algorithm 74 causes the mobile tablet computer 156 to send the pilot commands 150. When the telepresence robot 32 receives the pilot commands 150, the robot-side algorithm 68 interprets and executes the pilot commands 150 and instructs the telepresence robot 32 to move to the pilot's desired location. The remote participant 24 may thus pilot the telepresence robot 32, instructing it to face different conferees 26, as the video conference progresses.

FIG. 13 illustrates updates to the background view 34. When the telepresence robot 32 moves to the new location 114, or changes a viewing angle 158 of the front-facing camera 152, the background view 34 (behind the telepresence robot 32) likely changes. So, the telepresence robot 32 may send the new still image 100 to the naturalizing server 40. Again, room sensors 36 may also send room sensor data feed 188 to the naturalizing server 40. In some embodiments, the room sensors 36 send a complete set of room sensor data to the naturalizing server 40 in response to a change in viewing angle 158. In some embodiments, the room sensors 36 send a differential update of room sensor data to the naturalizing server 40. Further, conferee devices 56 may also send sensor data to the naturalizing server 56 in response to a change in viewing angle 158. The telepresence robot 32 may further determine a gaze direction of the conferee, and capture the new still image 100 in accordance with the determined gaze direction to include the portion of the videoconferencing environment in corresponding to the conferee (e.g., in front of the conferee's gaze). Thus, for example, if the gaze direction indicates that the eyes of conferee 26 are viewing the display device 28 at an angle, as opposed to directly perpendicular to the display device, the captured still image 100 may include at least the portion of the videoconferencing environment corresponding to the gaze direction of the conferee 26. The naturalizing server 40 discards the old, stale environmental image and superimposes the participant video data 92 onto the new still image 100, thus generating the new composite video data 96. The naturalizing server 40 sends the new composite video data 96 to the telepresence robot 32, wherein the remote participant 24 is visually presented in the new background view 34 in accordance with the still image, sensor data, and determined gaze direction.

As FIG. 13 also illustrates, other update strategies may be used. The GPS coordinates 120 or location of the telepresence robot 32 may change, requiring an update to the background view 34. The interval 130 of time may also require the update to the background view 34. The image analysis module 140 may also update to the background view 34. As this disclosure already explained these updates with reference to FIGS. 8-11, no repeated explanation is needed.

Figure 14:
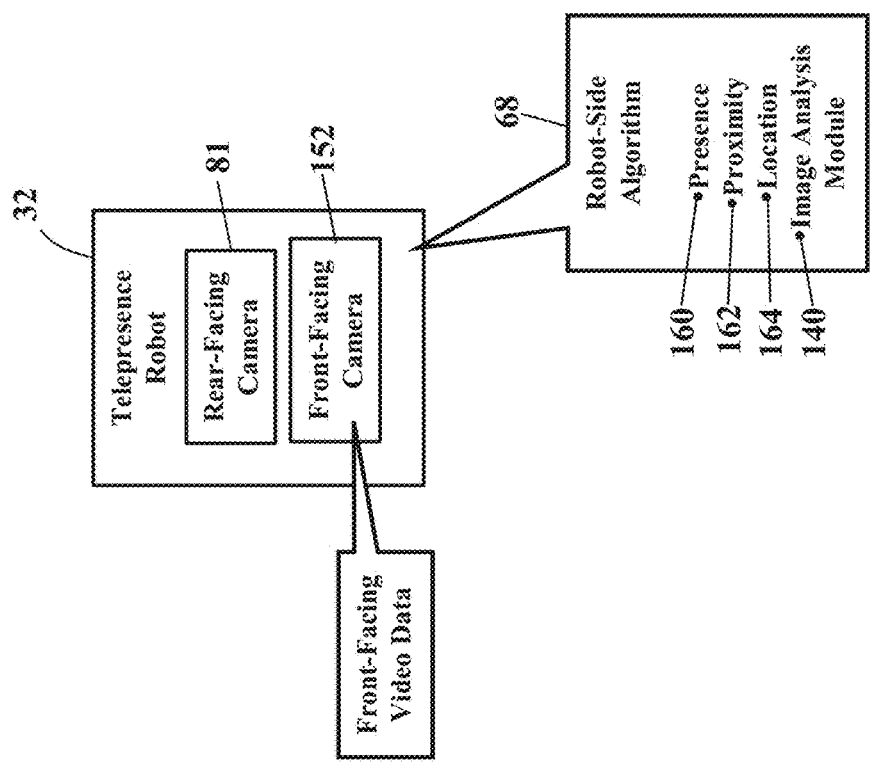
FIGS. 14-15 are schematics illustrating sensing capabilities, according to exemplary embodiments.
Figure 15:
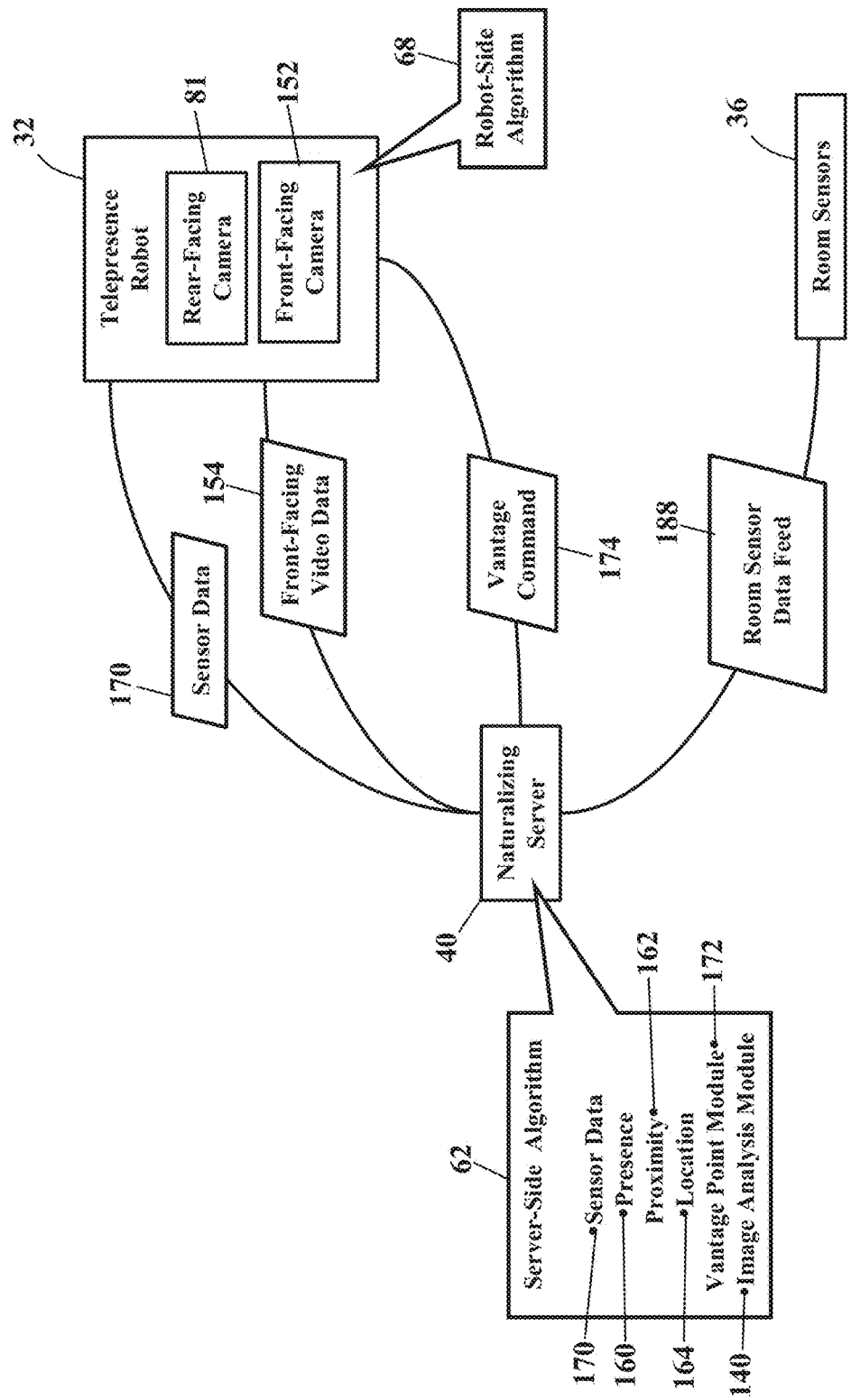

FIGS. 14-15 are schematics illustrating sensing capabilities, according to exemplary embodiments. Here, exemplary embodiments may sense the presence 160 and/or the proximity 162 of the fellow conferees 26. The telepresence robot 32 may have an infrared sensor (or other sensors, as described above with reference to room sensors 36) for detecting the presence 160 and/or the location 164 of the different conferees 26. Moreover, the front-facing video data 154 (captured by the front-facing camera 152) may be analyzed (perhaps by the image analysis module 140) to recognize faces, thus identifying the presence 160 and the location 164 of the different conferees 26. Indeed, as many sensor technologies are known for determining the presence 160 and the location 164 of the different conferees 26, no detailed explanation is needed. While FIG. 14 depicts telepresence robot 32 sensors detecting the presence 160 and/or location 164 of different conferees 26, in some embodiments, room sensors 32 may detect the presence 160 and/or location 164 of conferees 26.

FIG. 15 illustrates sensor data 170. Whatever sensors the telepresence robot 32 may have, or whatever room sensors 36 are present in the videoconferencing environment 20, raw or processed sensor data 170 and/or room sensor data feed 188 may be sent to the naturalizing server 40 for analysis. That is, the sensor data 170 may be an input to the naturalizing server 40. The sensor data 170 may allow the server-side algorithm 62 to determine the presence 160, the proximity 162, and/or the location 164 of the different conferees 26. The server-side algorithm 62 may call or invoke a vantage point module 172 that analyzes the sensor data 170. The vantage point module 172 determines, at least from the sensor data 170 and/or room sensor data feed 188, which conferee (illustrated as reference numeral 26 in FIG. 1) is dominant. For example, the vantage point module 172 may use audio data from microphones (not shown for simplicity) to determine which conferee 26 is currently talking. Moreover, the front-facing video data 84 (captured by the front-facing camera 152) may be sent to the naturalizing server 40 for analysis to determine which conferee 26 is talking. Indeed, the vantage point module 172 may even use the image analysis module 140 to determine a direction in which the dominant conferee 26 is gazing. Although vantage point module 172 is depicted as part of server-side algorithm 62, in some embodiments, robot-side algorithm 68 may include a vantage point module 172 to determine a direction in which the dominant conferee 26 is gazing. In some embodiments, determining a direction in which the dominant conferee 26 is gazing, or determining a gaze direction, influences the capturing of a new still image 100 to include the portion of the videoconferencing environment in corresponding to the conferee (e.g., in front of the conferee's gaze), and accordingly, a new still image 100 may be captured in accordance with a determined gaze direction for naturalization. While FIG. 15 depicts sensor data being transmitted from telepresence robot 32 to naturalizing server 40, in some embodiments, room sensor data feed 188 may be transmitted in addition to, or in replacement of, sensor data from telepresence robot 32. As described previously, room sensor data transmitted to naturalizing server 40 may be a point cloud of data or other form of data representative of the conferee environment.

Exemplary embodiments may turn and face the dominant conferee 26. Whichever conferee 26 is dominant, the telepresence robot 32 may be automatically moved and/or turned to face the dominant conferee 26. As the telepresence robot 32 displays the remote participant's image, exemplary embodiments may thus automatically keep the remote participant facing whichever conferee 26 is currently speaking or moving. As the vantage point module 172 analyzes the sensor data 170, the vantage point module 172 may generate vantage commands 174 that are sent from the naturalizing server 40 to the telepresence robot 32. The vantage commands 174 instruct the telepresence robot 32 to turn and face any of the conferees 26. Exemplary embodiments may thus refine the telepresence illusion by having the remote participant's image turn toward whoever is currently speaking.

The telepresence robot 32 may thus be remotely controlled. This disclosure explains how any one of the conferees 26 may command the telepresence robot 32 to move and turn about the video conferencing environment 20. The remote participant 24 may also command the telepresence robot 32 to move and turn. The naturalizing server 40 may even autonomously command the telepresence robot 32, using the vantage commands 174, to move and turn. The telepresence robot 32 may thus be remotely controlled, by multiple entities, during the videoconference 22.

Figure 16:
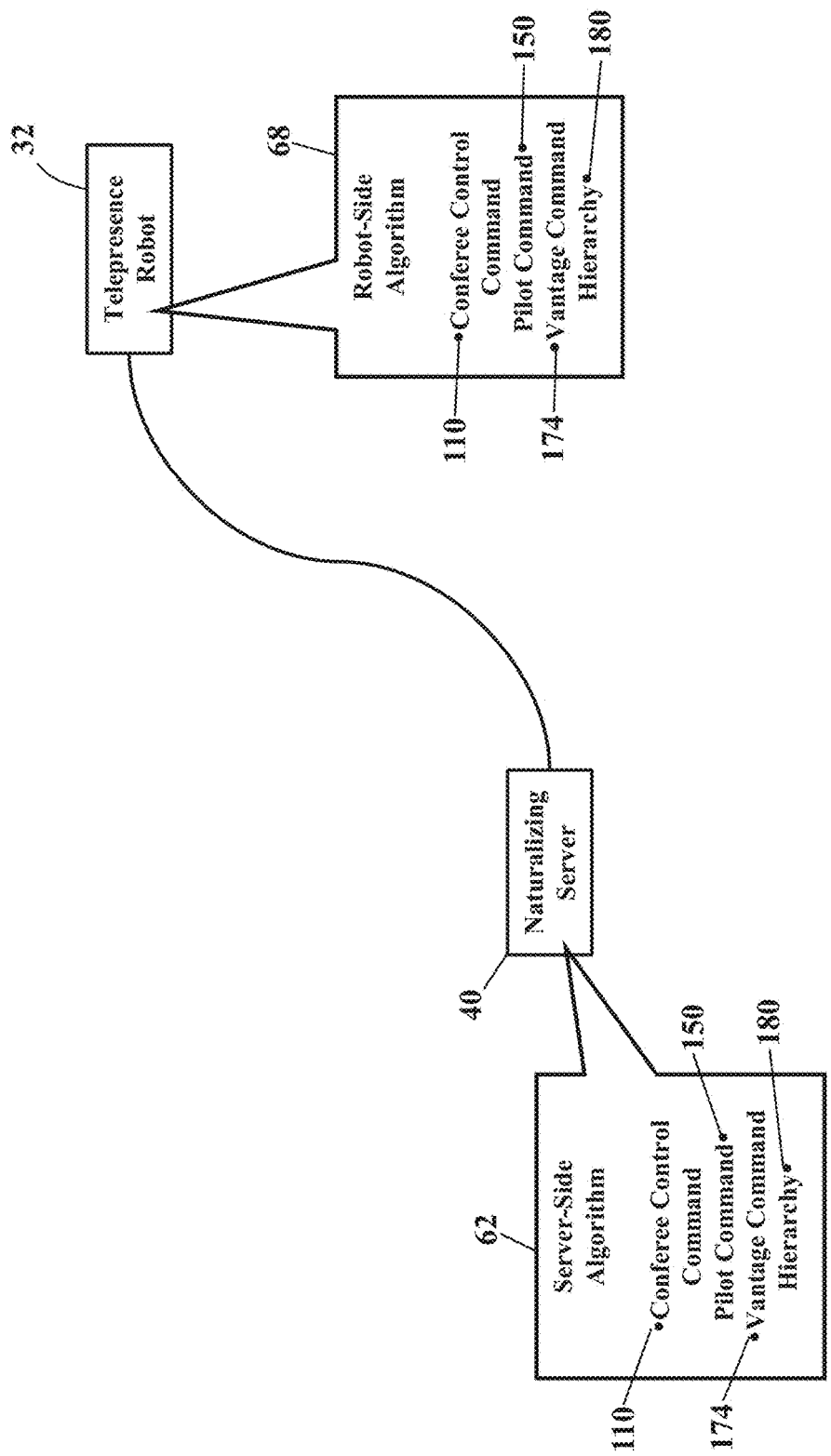
FIG. 16 is a schematic illustrating conflict resolution, according to exemplary embodiments.

FIG. 16 is a schematic illustrating conflict resolution, according to exemplary embodiments. When multiple entities control the telepresence robot 32, conflicts may arise. The remote participant's pilot device 52 may want to see the face of a non-speaking conferee-manager, while the naturalizing server 40 may want to turn the telepresence robot 32 to a speaking subordinate. At nearly the same time, one of the conferees 26 may want to turn the telepresence robot 32 for a better view of the remote participant 24. As FIG. 16 illustrates, the telepresence robot 32 may simultaneously, or contemporaneously, receive the conferee control command 110, the pilot command 150, and/or the vantage command 174. The telepresence robot 32 likely cannot respond to these multiple commands that want to nearly simultaneously move the vantage point.

A hierarchy 180 may be needed. As multiple commands may be issued, exemplary embodiments may assign priority to some commands. For example, exemplary embodiments may give the remote participant 24 complete control over the telepresence robot 32. That is, exemplary embodiments may ignore or disable the conferee control command 110 and the vantage commands 174. The remote participant's pilot device (illustrated as reference numeral 52 in FIG. 12) is thus the master, having sole control over the telepresence robot 32. A different hierarchy 180, however, may assign priority to the vantage point command 174, perhaps ignoring or disabling the conferee control command 110. The telepresence robot 32, in other words, may always face the speaking conferee (illustrated as reference numeral 26 in FIG. 1), keeping the remote participant's image directionally toward the current speaker. A fellow conferee 26 may perhaps only move the telepresence robot 32 when no one is speaking. Exemplary embodiments, however, may be configured for any hierarchical arrangement as needed or desired.

As FIG. 16 also illustrates, all commands may be routed to the naturalizing server 40. Even though the conferee device (illustrated as reference numeral 54 in FIG. 6) may issue the conferee control command 110, exemplary embodiments may route the conferee control command 110 to the naturalizing server 40. That is, all the conferee control commands 110 may be routed to the naturalizing server 40 to ensure the hierarchy 180 is enforced. The pilot command 150, likewise, may be routed to the naturalizing server 40 to ensure the hierarchy 180 is enforced. The server-side algorithm 62 may thus determine which of the commands 110, 150, and 174 gets priority for execution. The robot-side algorithm 68, however, may also have authority to enforce the hierarchy 180.

Figure 17:
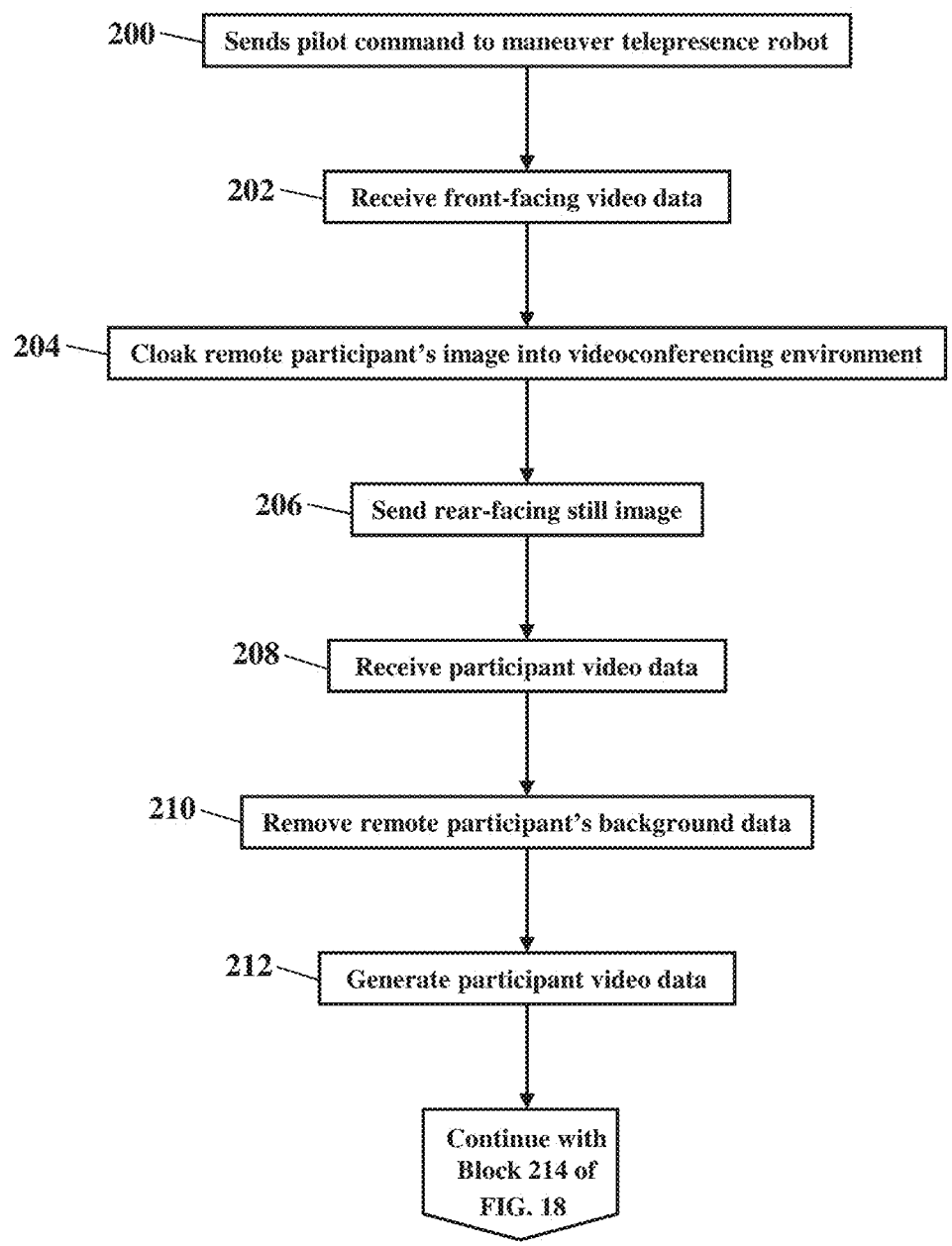
FIGS. 17-22 are flowcharts illustrating a method or algorithm for telepresence visualization, according to exemplary embodiments.
Figure 18:
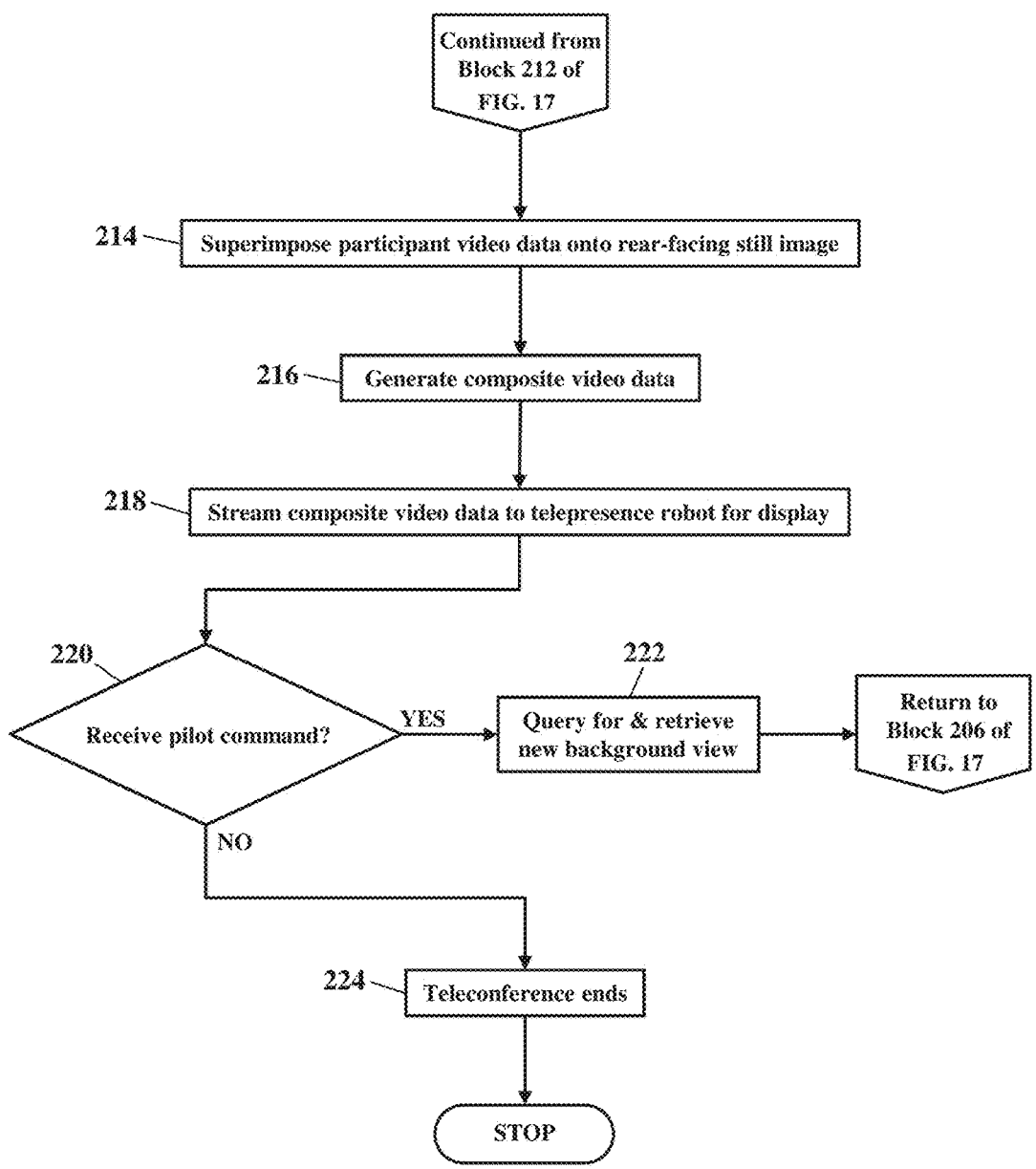

FIGS. 17-18 are flowcharts illustrating a method or algorithm for telepresence visualization, according to exemplary embodiments. Here exemplary embodiments may compensate for a complex background environment with a single, stationary conferee 26. The remote participant 24, using the pilot device 52, sends the pilot commands 150 to maneuver the telepresence robot 32 (Block 200). The remote participant's pilot device 52 receives the front-facing video data 154 (captured by the front-facing camera 152) (Block 202). The remote participant 24 is thus able to move the telepresence robot 32 to face the conferee 26. The naturalizing server 40 begins cloaking the remote participant's image into the videoconferencing environment 20 (Block 204). The telepresence robot 32 sends its rear-facing still image to the naturalizing server 40 (Block 206). In some embodiments, sensor data 170 from telepresence robot 32 sensors, or a room sensor data feed 188 from room sensors 36, is also sent to the naturalizing server 40. The naturalizing server 40 also receives the participant video data 92 from the remote participant's pilot device 52 (Block 208). As the telepresence robot 32 is blocking the background environment, the naturalizing server 40 identifies and removes the remote participant's background data 90 (Block 210) to generate the participant video data 92 (Block 212).

The flowchart continues with FIG. 18. Once the remote participant's video image is isolated, the naturalizing server 40 superimposes the participant video data 92 onto the rear-facing still image (Block 214) to generate the composite video data 96 (Block 216). The composite video data 96 is streamed to the telepresence robot 32 for display (Block 218).

The remote participant is thus dynamic. As the remote participant 24 is stationary at the pilot device 52, the remote participant's background data 90 is static and unchanging. So, even though the remote participant's video image may dynamically change (as the remote participant's mouth, head, and hands move), her background is unchanging. Moreover, as there is only a single conferee 26, exemplary embodiments may assume that the conferee 26 is also stationary.

Exemplary embodiments may thus simplify the need for updates to the teleconferencing illusion. Because the single conferee 26 is assumed to be stationary, the still image 100 may remain static until receipt of the pilot command 150 (Block 220). If the remote participant 24 moves the telepresence robot 32, exemplary embodiments may query for and receive a new background view 34 (Block 222). In some embodiments, updated sensor data from the telepresence robot 32 or room sensors 36 may also be queried and received. The new rear-facing still image 100 and sensor data are input as feedback to the naturalizing server 40 for superimposition with the participant video data 92 (Block 206 of FIG. 17). If no pilot command is received (Block 220), then no change may be needed. Exemplary embodiments continue streaming the composite video data 96 until the teleconference ends (Block 224).

Figure 19:
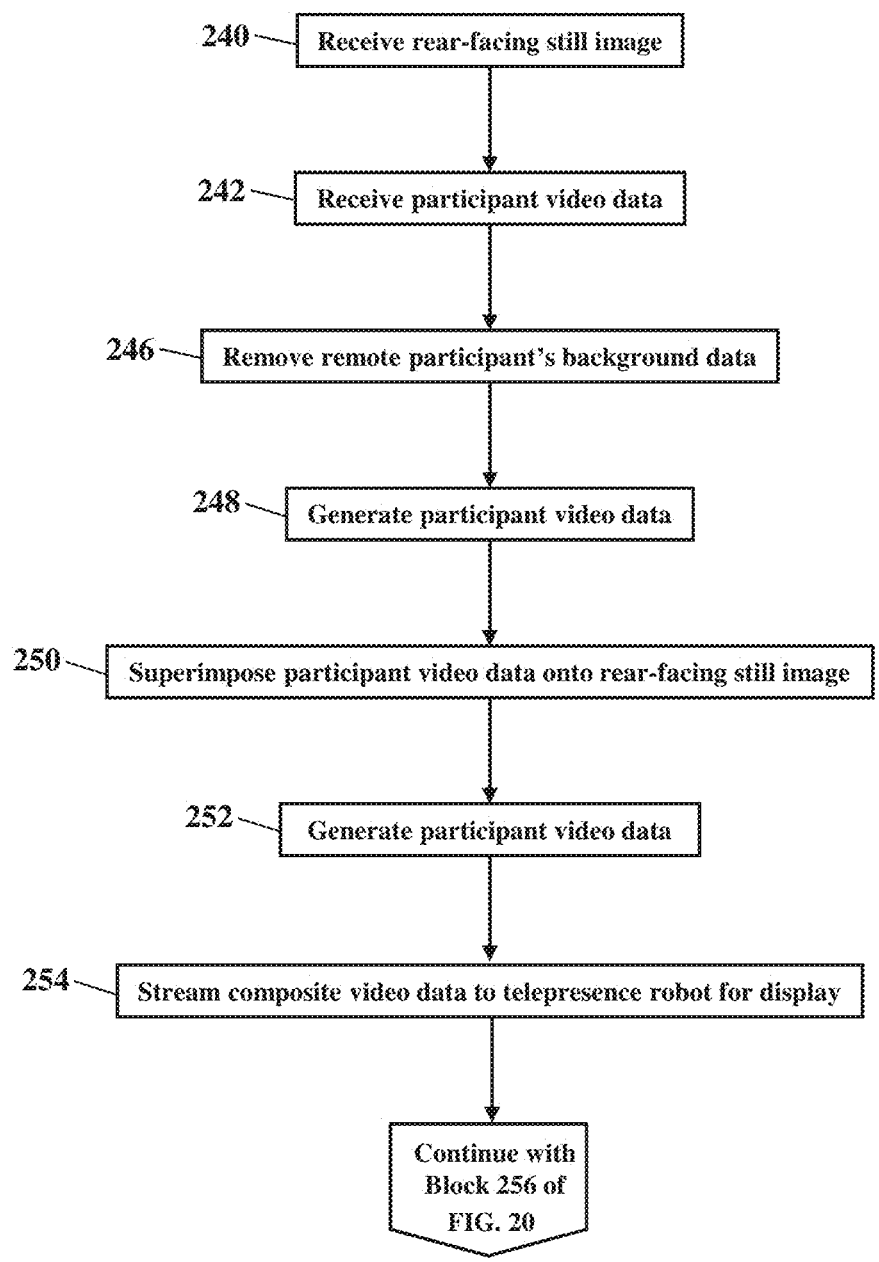
Figure 20:
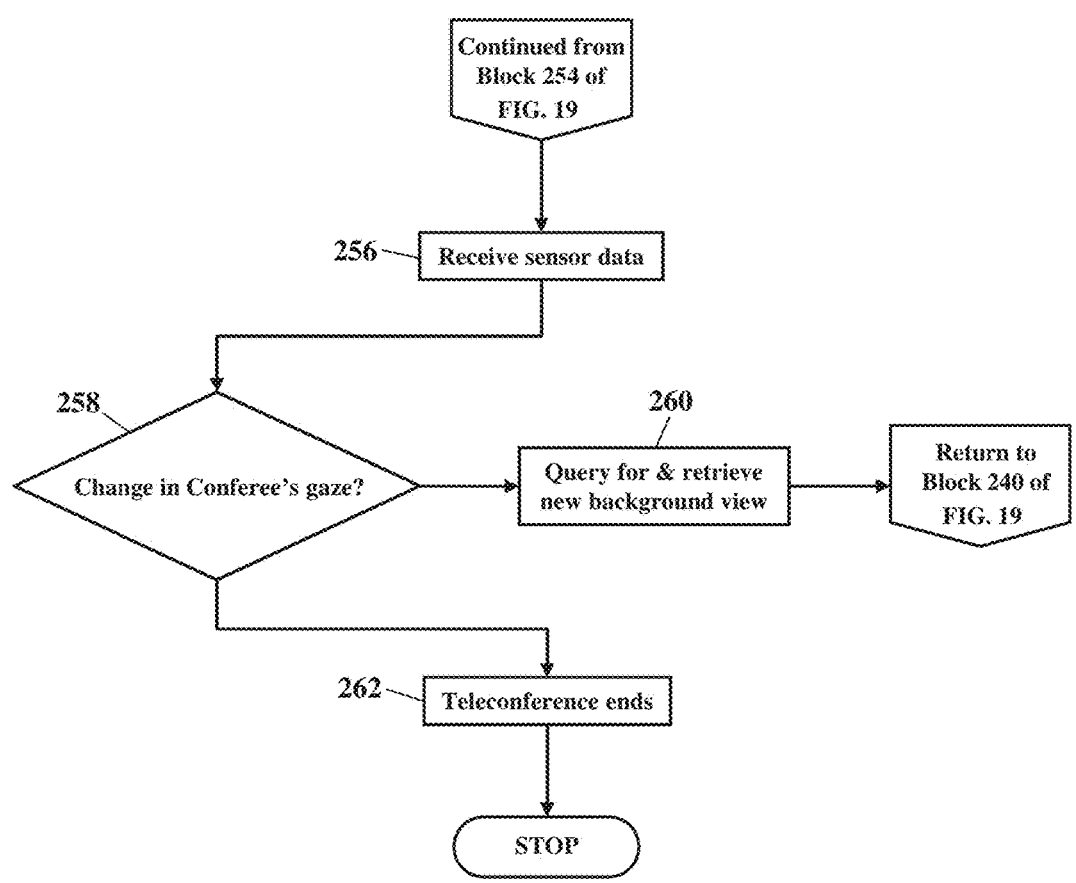

FIGS. 19-20 are more flowcharts illustrating the telepresence visualization, according to exemplary embodiments. Here exemplary embodiments may update the illusion of telepresence based on the conferee's gaze. Even though the remote participant 24 and the conferee 26 may both be stationary, the conferee's gaze may still change. Exemplary embodiments may thus perform updates in response to facial turns and even eye glances. The naturalizing server 40 receives the rear-facing still image 100 from the telepresence robot 32 (Block 240). In some embodiments, sensor data 170 from telepresence robot 32 sensors, or room sensor data feed 188 from room sensors 36, is also sent to the naturalizing server 40. The naturalizing server 40 also receives the participant video data 92 from the remote participant's pilot device 52 (Block 242). The naturalizing server 40 identifies and removes the remote participant's background data 90 (Block 246) to generate the participant video data 92 (Block 248). The naturalizing server 40 superimposes the participant video data 92 onto the rear-facing video data 82 (Block 250) to generate the composite video data 96 (Block 252). The composite video data 96 is streamed to the telepresence robot 32 for display (Block 254).

The flowchart continues with FIG. 20. The naturalizing server 40 also receives the sensor data 170 (Block 256), for example, to determine the conferee gaze direction. When the conferee's gaze changes (Block 258), exemplary embodiments may query for and receive a new still image 100 of the background view 34 (Block 260) and updated sensor data 170 and room sensor data feed 188. The new rear-facing still image and sensor data is input as feedback to the naturalizing server 40 for superimposition with the participant video data 92 (Block 240 of FIG. 19).

Some changes in gaze may not require updates. When exemplary embodiments determine a change in the conferee's gaze, the change may be compared to rules and/or thresholds. If the change is small (Block 258), no update may be required. Exemplary embodiments continue streaming the composite video data 96 until the teleconference ends (Block 262). As such, perhaps only larger changes in gaze (those that satisfy the rules and thresholds) require acquisition of the new rear-facing still image 100 and new sensor data 170 and/or room sensor data feed 188 for superimposition with the participant video data 92.

Figure 21:
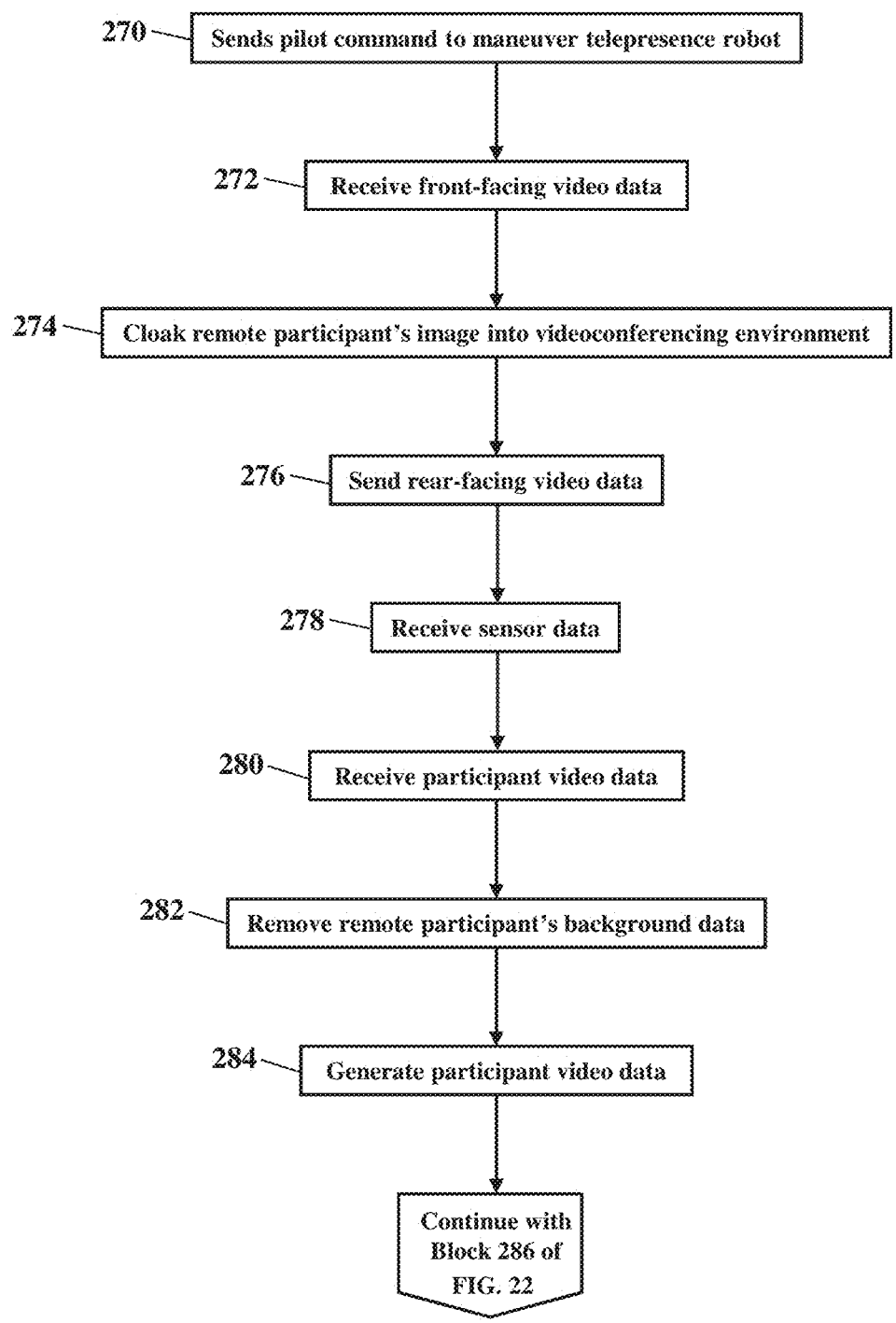

FIG. 21 is another flowchart illustrating the telepresence visualization, according to exemplary embodiments. Here exemplary embodiments may update the illusion of telepresence based on complex backgrounds due to the maneuvering telepresence robot 32. The remote participant's pilot device 52 sends the pilot commands 150 to maneuver the telepresence robot 32 (Block 270). The remote participant's pilot device 52 receives the front-facing pilot video data 84 (captured by the front-facing camera 152) (Block 272). The naturalizing server 40 begins cloaking the remote participant's image into the videoconferencing environment 20 (Block 274). The telepresence robot 32 sends its rear-facing, video data 82 to the naturalizing server 40 (Block 276). Because the telepresence robot 32 may be frequently maneuvering (perhaps due to the pilot commands 150 from the remote participant 24 and/or a roving conferee 26), the background environment may be rapidly changing. The rear-facing, video data 82 may thus be full motion, dynamic video. The naturalizing server 40 also receives the sensor data 170 (Block 278) from the telepresence robot 32 and room sensor data feed 188 from room sensors 36. Again, as the telepresence robot 32 may be frequently maneuvering due to the roving conferee 26, the sensor data 170 may be a stream of rich content representing the presence 160, proximity 162, and/or location 164 of the conferee 26 (as explained with reference to FIGS. 14-15) as well as content representing the conferee environment from room sensor data feed 188. The participant video data 92 is received (Block 280) and the remote participant's background data 90 is removed (Block 282) to generate the participant video data 92 (Block 284).

Figure 22:
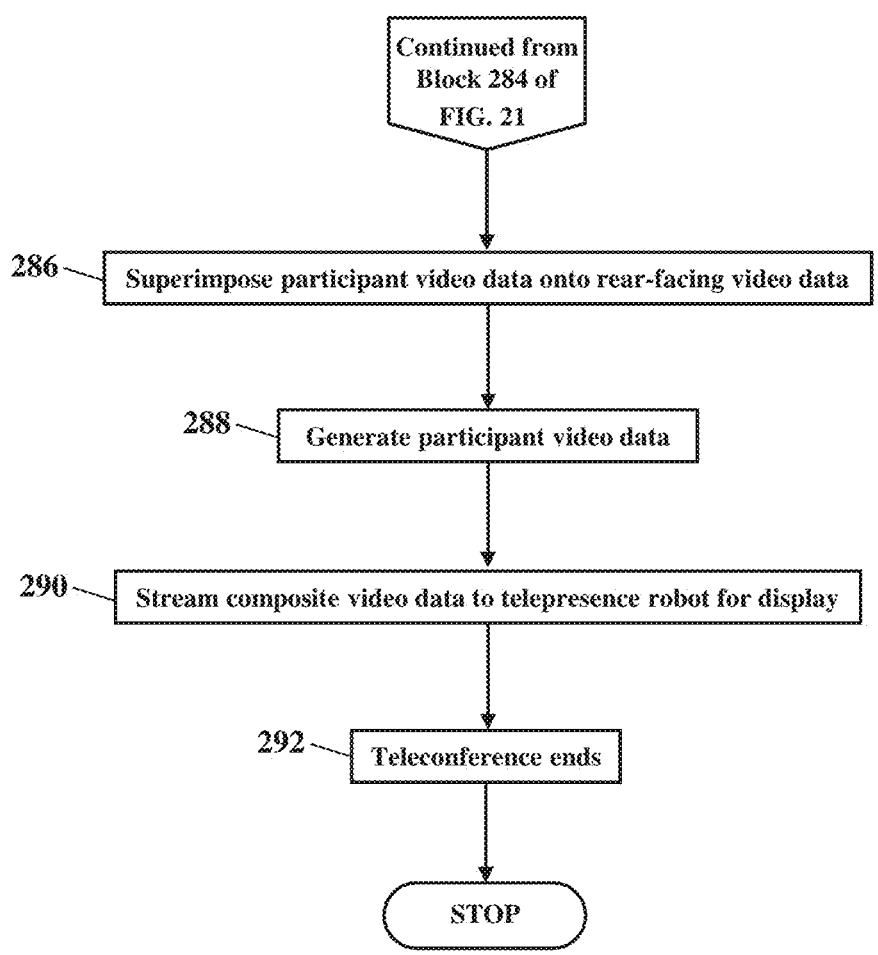

The flowchart continues with FIG. 22. Once the participant video data 92 is generated, the participant video data 92 is superimposed onto the rear-facing, motion video data 82 (Block 286) to generate the composite video data 96 (Block 288). The composite video data 96 is streamed to the telepresence robot 32 for display (Block 290). Exemplary embodiments continue streaming the composite video data 96 until the teleconference ends (Block 292).

FIGS. 21-22 thus illustrate a complex solution. Because the conferee 26 is roving about the conference environment 20, the background environment may be rapidly changing as full motion, dynamic video. Sensor data transmitted to the naturalizing server 40 may be rapidly changing as well. The remote participant's video data 92 is also motion video. Exemplary embodiments may thus superimpose one dynamic, real-time motion video over another dynamic, real-time motion video. Superimposition of two separate video streams may be mathematically complex, requiring more processing and memory capabilities, along with greater bandwidth in the communications network 50.

Exemplary embodiments even encompass more fully reflexive solutions. The above paragraphs explained the remote participant having the static background data 90. Some remote participants, however, may have a dynamic background. Consider, for example, situations in which the remote participant also has the telepresence robot 32 at her remote location. So, the conferee 26 may also issue the conferee control commands (illustrated as reference numeral 110 in FIG. 6) to control the telepresence robot 32 at the remote location. As the remote participant moves about the remote location, her telepresence robot 32 may follow her movements. That is, her telepresence robot 32 has a "follow me" mode of operation that keeps the pilot video data trained on her face or body movements. Indeed, the telepresence robot 32 in the conferencing environment 20, and the telepresence robot 32 at the remote location, may cooperate in a "follow me/follow each other" fashion to keep the videoconference 20 respectively trained on the conferee 26 and on the remote participant 24. While these solutions may be more complex, their variations are within a person of ordinary skill.

Figure 23:
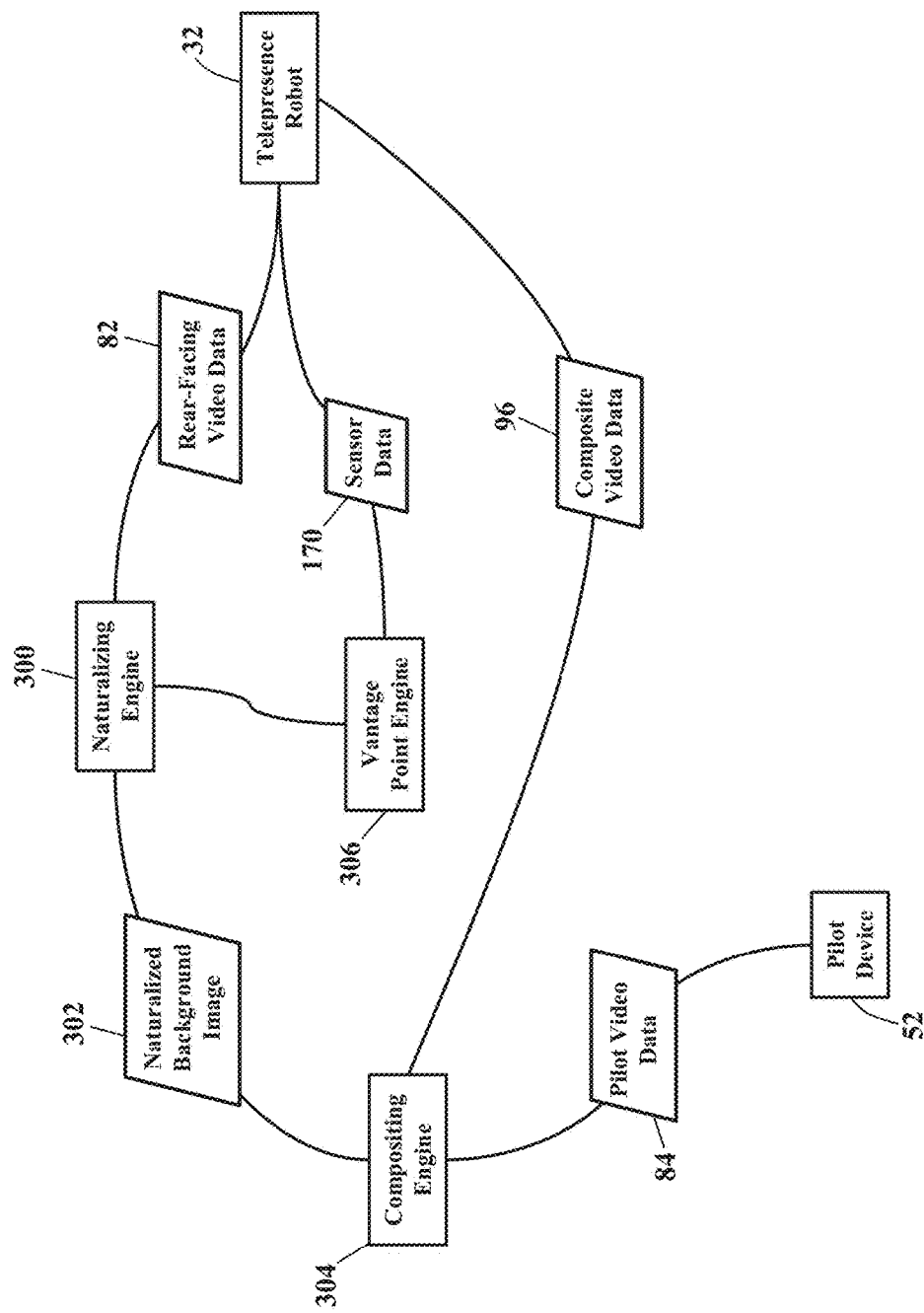
FIG. 23 is a functional diagram illustrating distributed processing, according to exemplary embodiments.

FIG. 23 is a functional diagram illustrating distributed processing, according to exemplary embodiments. Heretofore the naturalizing server 40 has been described as performing the telepresence illusion. FIG. 23, though, illustrates how the telepresence visualizations may be functionally distributed among multiple devices. For example, a naturalizing engine 300 receives the rear-facing, video data 82 from the telepresence robot 32 and sensor data from the telepresence robot 32 and room sensors 36, and produces a naturalized background image 302. A compositing engine 304 receives the pilot video data 84 and the naturalized background image 302. The compositing engine 304 performs the superimposition and generates the composite video data 96 for display by the telepresence robot 32. A vantage point engine 306 receives the sensor data 170 and determines the conferee's gaze, which is fed back to the naturalizing engine 300. Exemplary embodiments, then, may assign or subcontract any processing function to a different device to reduce processing demands.

Figure 24:
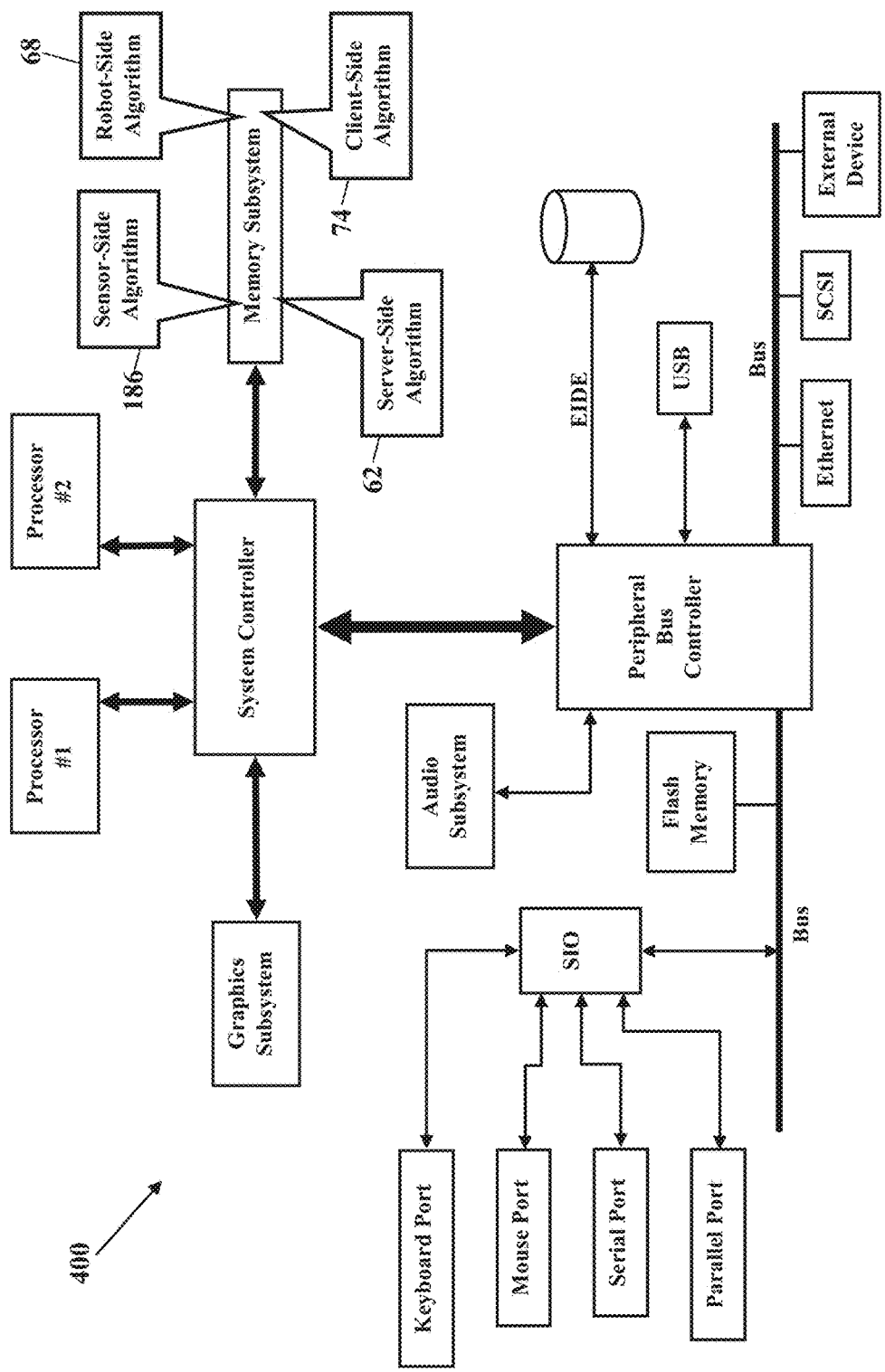
FIGS. 24-25 depict still more operating environments for additional aspects of the exemplary embodiments.

FIG. 24 is a schematic illustrating still more exemplary embodiments. FIG. 24 is a generic block diagram illustrating the server-side algorithm 62, the robot-side algorithm 68, the client-side algorithm 74, and the sensor-side algorithm 186 operating within a processor-controlled device 400. As the above paragraphs explained, the server-side algorithm 62, the robot-side algorithm 68, and the client-side algorithm 74 may operate in any processor-controlled device 400. FIG. 24, then, illustrates the server-side algorithm 62, the robot-side algorithm 68, and the client-side algorithm 74 stored in a memory subsystem of the processor-controlled device 400. One or more processors communicate with the memory subsystem and execute the server-side algorithm 62, the robot-side algorithm 68, and the client-side algorithm 74. Because the processor-controlled device 300 illustrated in FIG. 24 is well known to those of ordinary skill in the art, no detailed explanation is needed.

Figure 25:
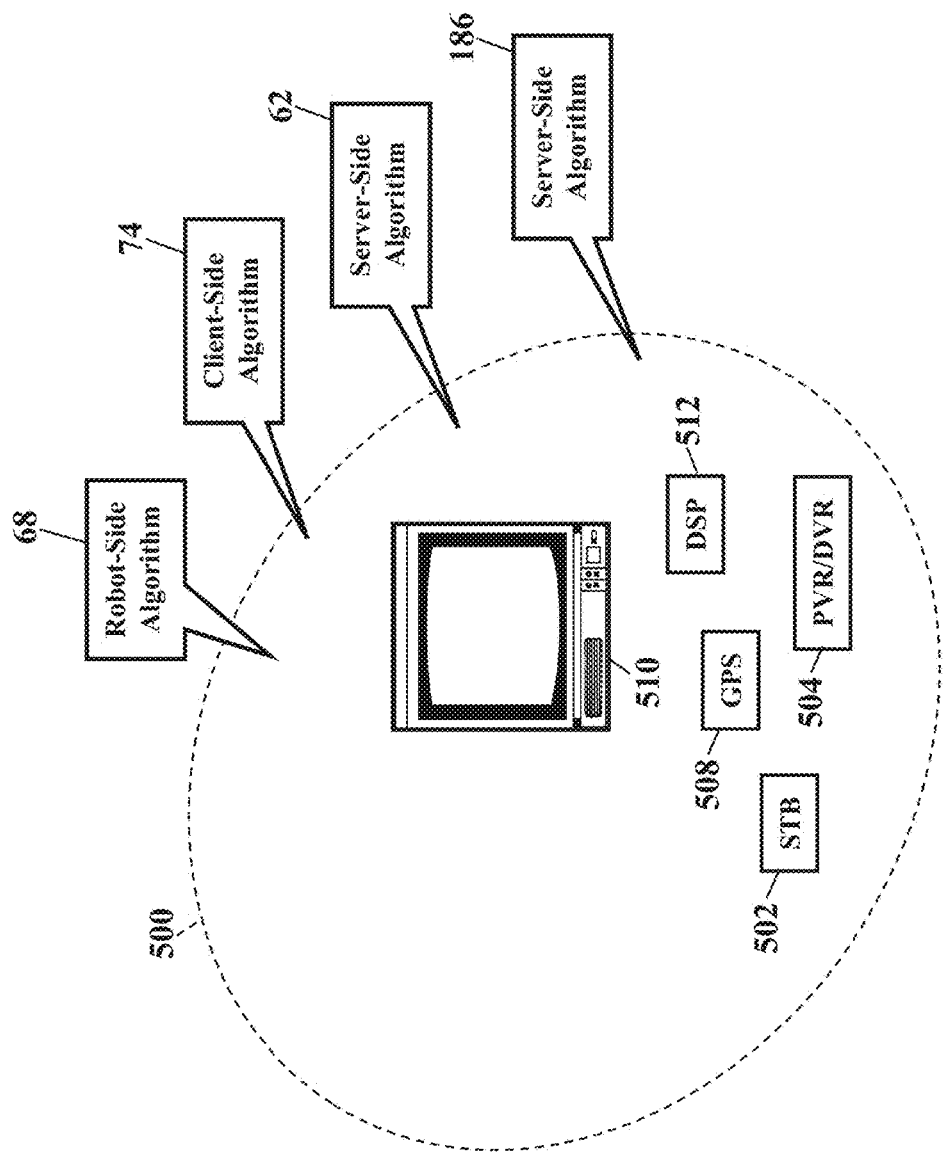

FIG. 25 depicts other possible operating environments for additional aspects of the exemplary embodiments. FIG. 25 illustrates the server-side algorithm 62, the robot-side algorithm 68, the client-side algorithm 74, and the sensor-side algorithm 186 operating within various other devices 500. FIG. 25, for example, illustrates that the server-side algorithm 62, the robot-side algorithm 68, the client-side algorithm 74, and/or the sensor-side algorithm 186 may entirely or partially operate within a set-top box ("STB") (502), a personal/digital video recorder (PVR/DVR) 504, a Global Positioning System (GPS) device 508, an interactive television 510, or any computer system, communications device, or processor-controlled device utilizing a digital signal processor (DP/DSP) 512. The device 500 may also include watches, radios, vehicle electronics, clocks, printers, gateways, mobile/implantable medical devices, and other apparatuses and systems. Because the architecture and operating principles of the various devices 500 are well known, the hardware and software componentry of the various devices 500 are not further shown and described.

Exemplary embodiments may be physically embodied on or in a computer-readable memory. The memory may include CD-ROM, DVD, tape, cassette, floppy disk, memory card, USB, and large-capacity disks. The memory could be distributed to end-subscribers, licensees, and assignees. A computer program product comprises processor-executable instructions for telepresence visualizations, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

What is claimed is:

1. A method, comprising:
receiving, by a server, a location identifier for a videoconferencing environment;
retrieving, by the server, a cached point cloud map of sensor data of the videoconferencing environment and a cached image of the videoconferencing environment, the cached point cloud map of sensor data captured by one or more room sensors present in the videoconferencing environment, the cached image of the videoconferencing environment captured by one or more image capture devices within the videoconferencing environment;
receiving, by the server, participant video of a remote participant of the video conference, wherein the remote participant is situated in a location that is physically separate from the videoconferencing environment;
removing, by the server, a background portion of the participant video, wherein removing the background portion of the participant video results in a foreground portion of the participant video of the remote participant;
superimposing the foreground portion of the participant video onto the cached image of the videoconferencing environment using the cached point cloud map of sensor data of the video conferencing environment, wherein the superimposing generates composite video of the remote participant; and
transmitting the composite video for display.

2. The method of claim 1, further comprising:
receiving, by the server, a differential update point cloud map of sensor data of the videoconferencing environment captured by one or more room sensors present in the videoconferencing environment;

wherein superimposing the foreground portion of the participant video onto the image of the videoconferencing environment uses the cached point cloud map of sensor data and the differential update point cloud map of sensor data of the videoconferencing environment.

3. The method of claim 1, wherein the cached point cloud map of sensor data of the videoconferencing environment is retrieved at a first time, and wherein the differential update point cloud map of sensor data of the videoconferencing is received at a second time, and wherein the second time is later than the first time.

4. The method of claim 1, further comprising receiving positional information of a display device in the videoconferencing environment, and wherein the superimposing the foreground portion of the participant video onto the image of the videoconferencing environment utilizes an image of a portion of the videoconferencing environment behind the display device and sensor data of a portion of the videoconferencing environment behind the display device.

5. The method of claim 1, further comprising:
   receiving, by the server, a gaze direction of a videoconferencing participant present in the videoconferencing environment based at least in part on one or more sensors of an augmented reality device of the videoconferencing participant; and
   wherein the superimposing the foreground portion of the participant video onto the image of the videoconferencing environment utilizes an image of a portion of the videoconferencing environment corresponding to the gaze direction of the videoconferencing participant present in the videoconferencing environment.

6. The method of claim 1, further comprising receiving positional information of a conference participant within the videoconferencing environment based at least in part on one or more sensors of a device of the videoconferencing participant, and wherein the superimposing the foreground portion of the participant video onto the image of the videoconferencing environment utilizes an image of the portion of the videoconferencing environment viewed by the conference participant, based on the positional information of the conference participant.

7. The method of claim 1, wherein the one or more room sensors present in the videoconferencing environment include one or more of an optical sensor, an acoustic sensor, a proximity sensor, a light detecting and ranging (LIDAR) sensor, and a photogrammetry sensor.

8. A system for conducting a video conference, comprising:
   a room sensor within a videoconferencing environment configured to capture a point cloud map of sensor data of the videoconferencing environment;
   an image capture device within the videoconferencing environment;
   a display device within the videoconferencing environment;
   a naturalizing server, coupled to the room sensor, image capture device, and display device, the naturalizing server configured to receive a locational identifier for the videoconferencing environment and retrieve a cached point cloud map of sensor data of the videoconferencing environment captured by the room sensor and a cached image of the videoconferencing environment captured by the image capture device;
   the naturalizing server further configured to receive participant video of a remote participant of the video conference, wherein the remote participant is situated in a location that is physically separate from the videoconferencing environment;
   the naturalizing server further configured to process the participant video and the videoconferencing environment data, to remove a background portion of the participant video, wherein removing the background portion of the participant video results in a foreground portion of the participant video of the remote participant, and to superimpose the foreground portion of the participant video onto the cached image of the videoconferencing environment using the cached point cloud map of sensor data of the videoconferencing environment, wherein the superimposing generates composite video of the remote participant; and
   the naturalizing server supplying the composite video data for display on the display device.

9. The system of claim 8, wherein the naturalizing server is further configured to:
   receive a differential update point cloud map of sensor data of the videoconferencing environment captured by one or more room sensors present in the videoconferencing environment;
   wherein superimposing the foreground portion of the participant video onto the image of the videoconferencing environment uses the cached point cloud map of sensor data and the differential update point cloud map of sensor data of the videoconferencing environment.

10. The system of claim 8, wherein the cached point cloud map of sensor data of the videoconferencing environment is retrieved at a first time, and wherein the differential update point cloud map of sensor data of the videoconferencing is received at a second time, and wherein the second time is later than the first time.

11. The system of claim 8, wherein the naturalizing server is further coupled to receive positional information of a display device in the videoconferencing environment, and
   wherein the superimposing the foreground portion of the participant video onto the image of the videoconferencing environment utilizes an image of a portion of the videoconferencing environment behind the display device and sensor data of a portion of the videoconferencing environment behind the display device.

12. The system of claim 8, wherein the naturalizing server is further configured to receive a gaze direction of a videoconferencing participant present in the videoconferencing environment from one or more sensors of an augmented reality device of the videoconferencing participant; and
   wherein the superimposing the foreground portion of the participant video onto the image of the videoconferencing environment utilizes an image of a portion of the videoconferencing environment corresponding to the gaze direction of the videoconferencing participant present in the videoconferencing environment.

13. The system of claim 8, wherein the one or more sensors present in the videoconferencing environment include one or more of an optical sensor, an acoustic sensor, a proximity sensor, a light detecting and ranging (LIDAR) sensor, and a photogrammetry sensor.

14. A non-transitory computer-readable medium storing instructions that, when executed, cause a processor to perform operations, comprising:
   receiving a location identifier for a videoconferencing environment;
   retrieving a cached point cloud map of sensor data of the videoconferencing environment and a cached image of the videoconferencing environment, the cached point cloud map of sensor data captured by one or more room sensors present in the videoconferencing environment, the cached image of the videoconferencing environment captured by one or more image capture devices within the videoconferencing environment;

receiving participant video of a remote participant of the video conference, wherein the remote participant is situated in a location that is physically separate from the videoconferencing environment;

removing a background portion of the participant video, wherein removing the background portion of the participant video results in a foreground portion of the participant video of the remote participant;

superimposing the foreground portion of the participant video onto the cached image of the videoconferencing environment using the cached point cloud map of sensor data of the video conferencing environment, wherein the superimposing generates composite video of the remote participant; and transmitting the composite video for display.

15. The non-transitory computer-readable medium of claim 14, wherein the operations further comprise:

receiving a differential update point cloud map of sensor data of the videoconferencing environment captured by one or more room sensors present in the videoconferencing environment;

wherein superimposing the foreground portion of the participant video onto the image of the videoconferencing environment uses the cached point cloud map of sensor data and the differential update point cloud map of sensor data of the videoconferencing environment.

16. The non-transitory computer-readable medium of claim 14, wherein the cached point cloud map of sensor data of the videoconferencing environment is retrieved at a first time, and wherein the differential update point cloud map of sensor data of the videoconferencing is received at a second time, and wherein the second time is later than the first time.

17. The non-transitory computer-readable medium of claim 14, wherein the operations further comprise:

receiving a gaze direction of a videoconferencing participant present in the videoconferencing environment based at least in part on one or more sensors of an augmented reality device of the videoconferencing participant; and wherein the superimposing the foreground portion of the participant video onto the image of the videoconferencing environment utilizes an image of a portion of the videoconferencing environment corresponding to the gaze direction of the videoconferencing participant present in the videoconferencing environment.

18. The non-transitory computer-readable medium of claim 14, wherein the one or more room sensors present in the videoconferencing environment include one or more of an optical sensor, an acoustic sensor, a proximity sensor, a light detecting and ranging (LIDAR) sensor, and a photogrammetry sensor.

19. The non-transitory computer-readable medium of claim 14, wherein the operations further comprise:

receiving positional information of a display device in the videoconferencing environment, and wherein the superimposing the foreground portion of the participant video onto the image of the videoconferencing environment utilizes an image of a portion of the videoconferencing environment behind the display device and sensor data of a portion of the videoconferencing environment behind the display device.

20. The non-transitory computer-readable medium of claim 14, wherein the operations further comprise:

receiving positional information of a conference participant within the videoconferencing environment based at least in part on one or more sensors of a device of the videoconferencing participant, and wherein the superimposing the foreground portion of the participant video onto the image of the videoconferencing environment utilizes an image of the portion of the videoconferencing environment viewed by the conference participant, based on the positional information of the conference participant.

* * * * *